(12) United States Patent
Ohmura et al.

(10) Patent No.: US 6,766,080 B2
(45) Date of Patent: Jul. 20, 2004

(54) OPTICAL WAVEGUIDE TYPE DEFRACTION GRATING DEVICE AND A METHOD OF MANUFACTURING THEREOF

(75) Inventors: Masaki Ohmura, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/051,299

(22) Filed: Jan. 22, 2002

(65) Prior Publication Data

US 2003/0012498 A1 Jan. 16, 2003

Related U.S. Application Data

(60) Provisional application No. 60/340,484, filed on Dec. 18, 2001.

(30) Foreign Application Priority Data

Jul. 10, 2001 (JP) ..................................... P2001-209826
Jan. 21, 2002 (JP) ..................................... P2002-012017

(51) Int. Cl.[7] .............................. G02B 6/34; G02B 6/10
(52) U.S. Cl. .......................... 385/37; 385/129; 385/130; 385/131
(58) Field of Search .......................... 385/37, 129, 130, 385/131

(56) References Cited

U.S. PATENT DOCUMENTS

| | | | | |
|---|---|---|---|---|
| 5,042,897 A | * | 8/1991 | Meltz et al. ................. | 385/37 |
| 5,740,292 A | * | 4/1998 | Strasser ...................... | 385/37 |
| 5,832,156 A | * | 11/1998 | Strasser et al. ............. | 385/48 |
| 6,005,999 A | * | 12/1999 | Singh et al. ................. | 385/37 |
| 6,292,606 B1 | * | 9/2001 | Riant et al. .................. | 385/37 |
| 6,427,041 B1 | * | 7/2002 | Strasser et al. ............. | 385/37 |
| 2002/0172461 A1 | * | 11/2002 | Singer et al. ................ | 385/37 |
| 2002/0181914 A1 | * | 12/2002 | Jansen ........................ | 385/130 |

FOREIGN PATENT DOCUMENTS

| | | |
|---|---|---|
| EP | 0 672 922 A2 | 9/1995 |
| EP | 1 111 415 A1 | 6/2001 |
| JP | 11-084117 | 3/1999 |
| JP | 2000-266945 | 9/2000 |
| JP | 2001-21738 | 1/2001 |
| JP | 2001-021738 | 1/2001 |

OTHER PUBLICATIONS

Ultra Narrow–Band Optical Fibre Sidetap Filters, M.J. Holmes et al., ECOC '998, Sep. 20–24, 1998, Madrid, Spain, pp. 137–138.

(List continued on next page.)

*Primary Examiner*—Brian Healy
*Assistant Examiner*—Tina M Lin
(74) *Attorney, Agent, or Firm*—McDermott, Will & Emery

(57) ABSTRACT

According to the present invention, a periodically perturbation part which serves as a refractive index modulated part is provided in a part of the optical waveguide of an optical fiber or the like in the longitudinal direction thereof, a line perpendicular to a level plane of this periodically perturbation part is tilted with respect to the optical axis X of the optical waveguide, and the plane defined by this optical axis X and a line A intersecting the optical axis X, that is, the deflection angle plane M is made, by twisting or the like, to include a portion that varies depending on the position of the optical waveguide in the longitudinal direction thereof. Thereby, the deflection angle direction Y of the optical waveguide is altered in the longitudinal direction thereof, the polarization in the deflection angle direction and the polarization in a direction perpendicular to the deflection angle direction are canceled in the longitudinal direction of the optical waveguide, and an optical waveguide type filter with low wavelength dependency is provided.

18 Claims, 19 Drawing Sheets

OTHER PUBLICATIONS

"Wideband Gain Flattened Erbium Fibre Amplifier Using a Photosensitive Fibre Blazed Grating", R. Kashyap et al., Electronics Letters, Jan. 21st, 1993, vol. 29, No. 2, pp. 154–156.

"Birefringence reduction in side–written photoinduced fiber devices by a dual–exposure method", Ashish M. Vengsarkar et al., Optics Letters, vol. 19, No. 16, Aug. 15, 1994, pp. 1260–1262.

"Long–Period Fiber Gratings as Band–Rejection Filters", Ashish M. Vengsarkar et al., Journal of Lightwave Technology, vol. 14, No. 1, Jan. 1996, pp. 58–65.

"Radiation–mode coupling loss in tilted fiber phase gratings", T. Erdogan et al., Optics Letters, vol. 20, No. 18, Sep. 15, 1995, pp. 1838–1840.

Holmes, M.J. Kashyap, R. Wyatt, R. Smith, R.P., Ultra narrow–band optical fibre sidetap filters, Optical Communication, 1998. 24th European Conference on, Sep. 20–24, 1998, Madrid, Spain, vol. 1, pp. 137 –138.

Westbrook, P.S. Strasser, T.A. Erdogan, T., In–line polarimeter using blazed fiber gratings, IEEE Photonics Technology Letters, Oct. 2000, vol.: 12 Issue: 10, pp. 1352 –1354.

* cited by examiner

Fig.1A
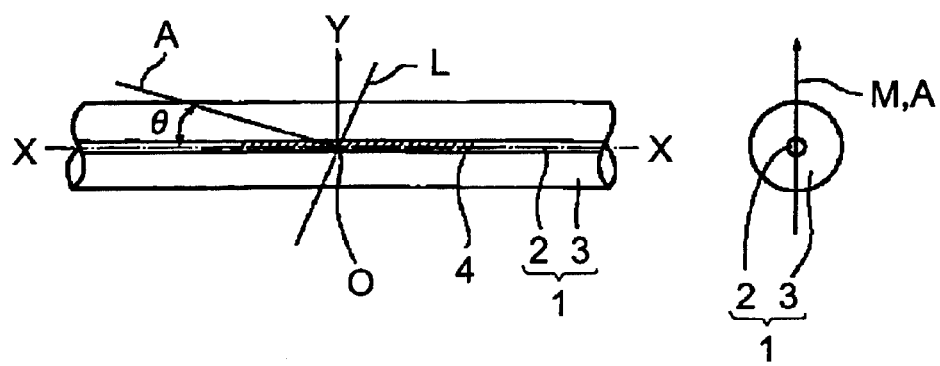
Fig.1B
Fig.1C
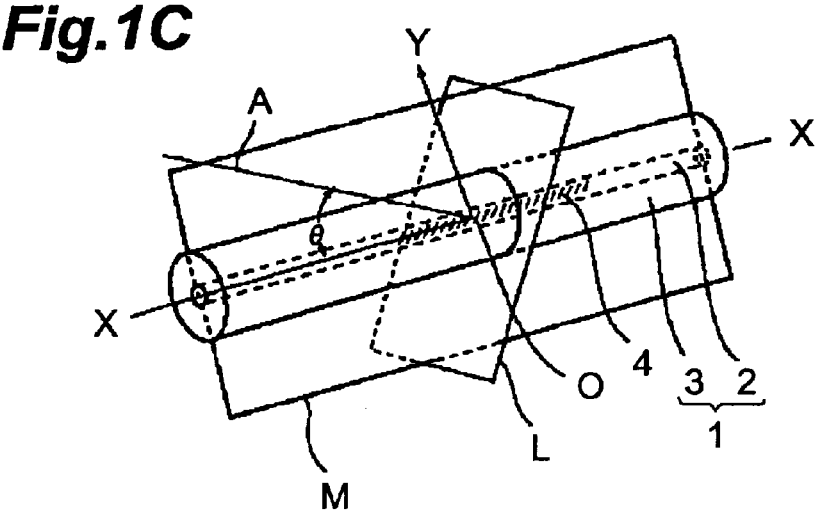

| P-P SECTIONAL VIEW | Q-Q SECTIONAL VIEW | R-R SECTIONAL VIEW | S-S SECTIONAL VIEW |

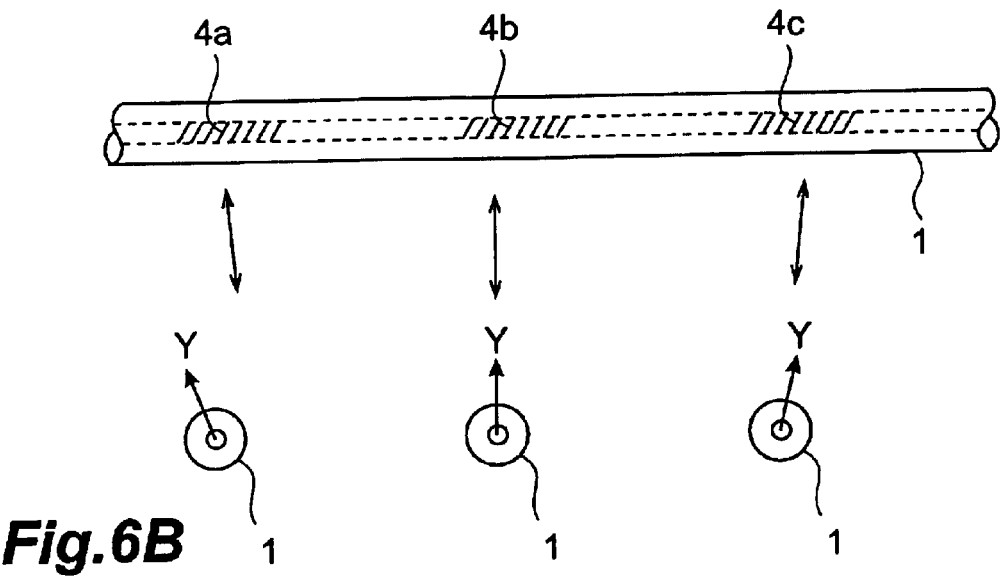
Fig.6A
Fig.6B
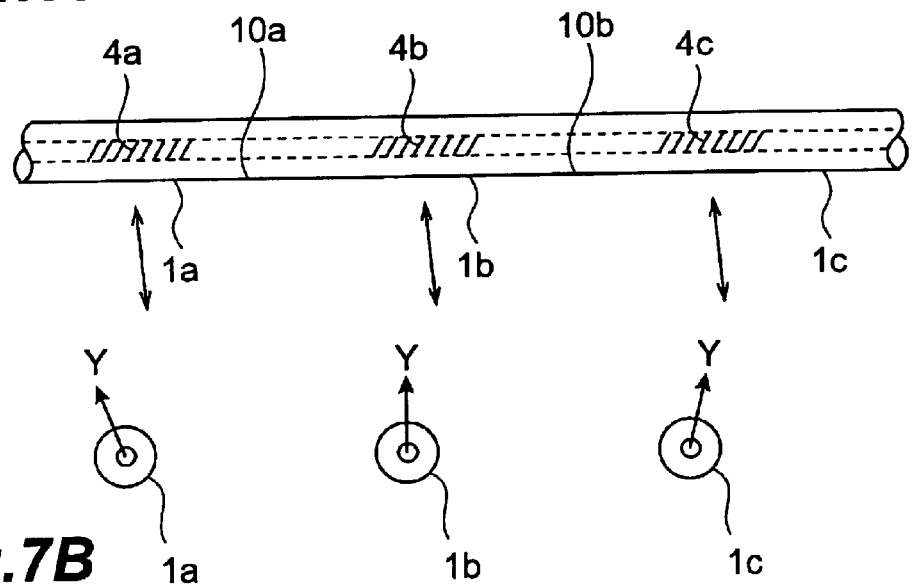
Fig.7A
Fig.7B

*Fig.10A*
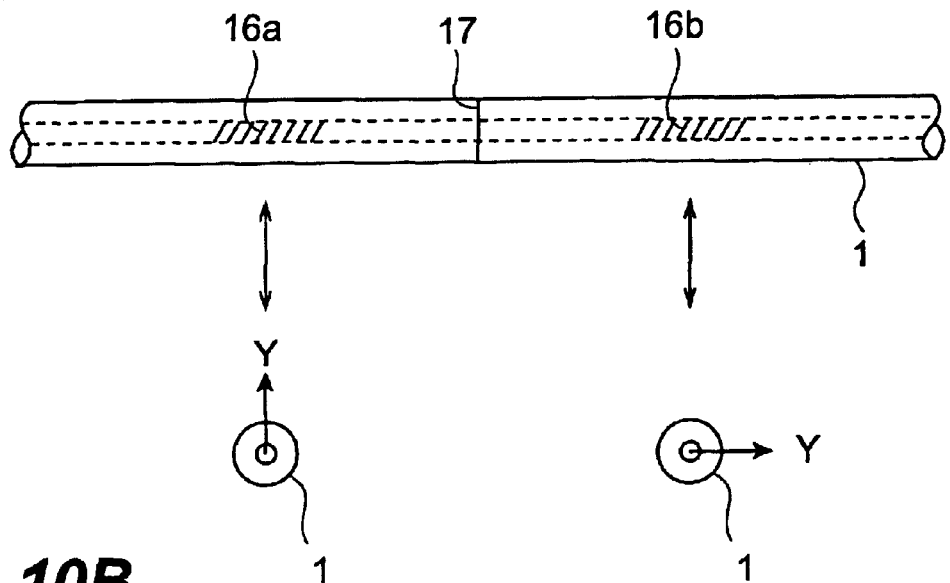
*Fig.10B*
*Fig.11*
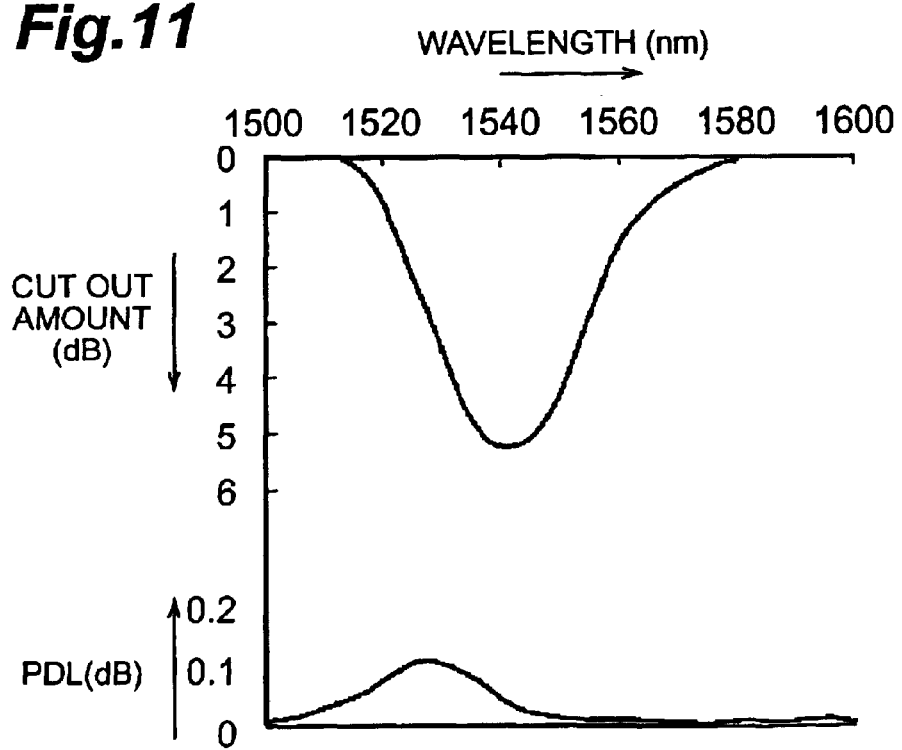

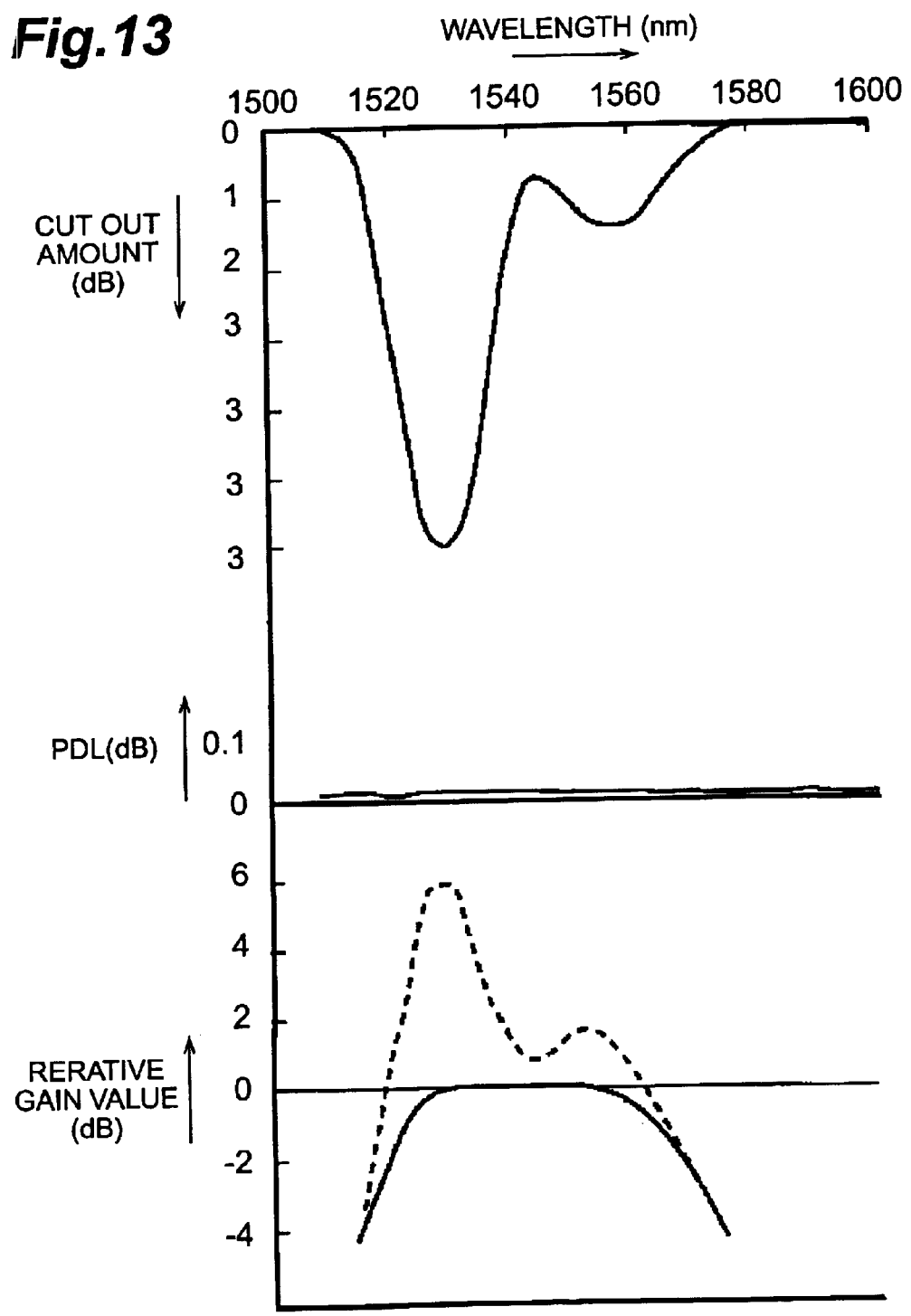

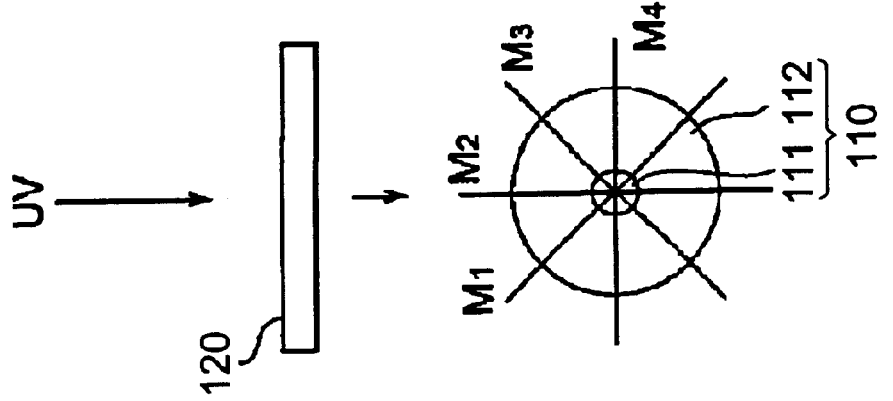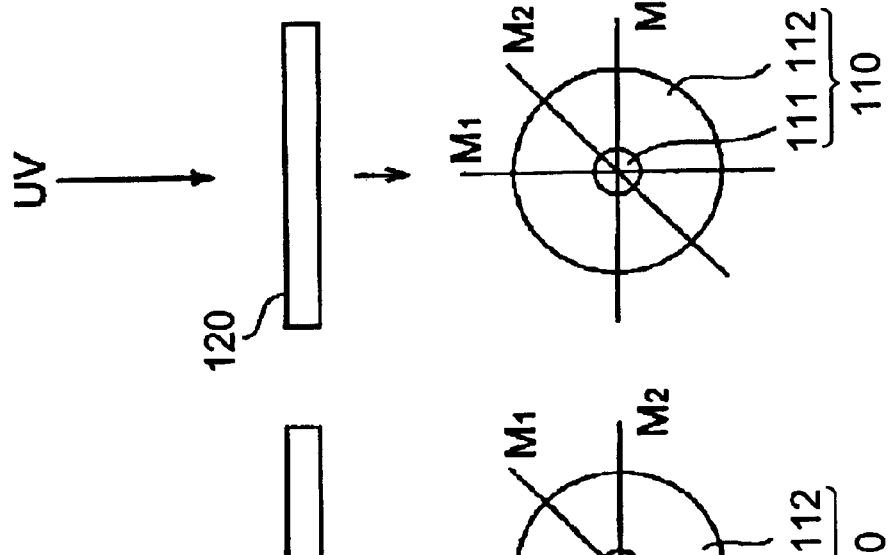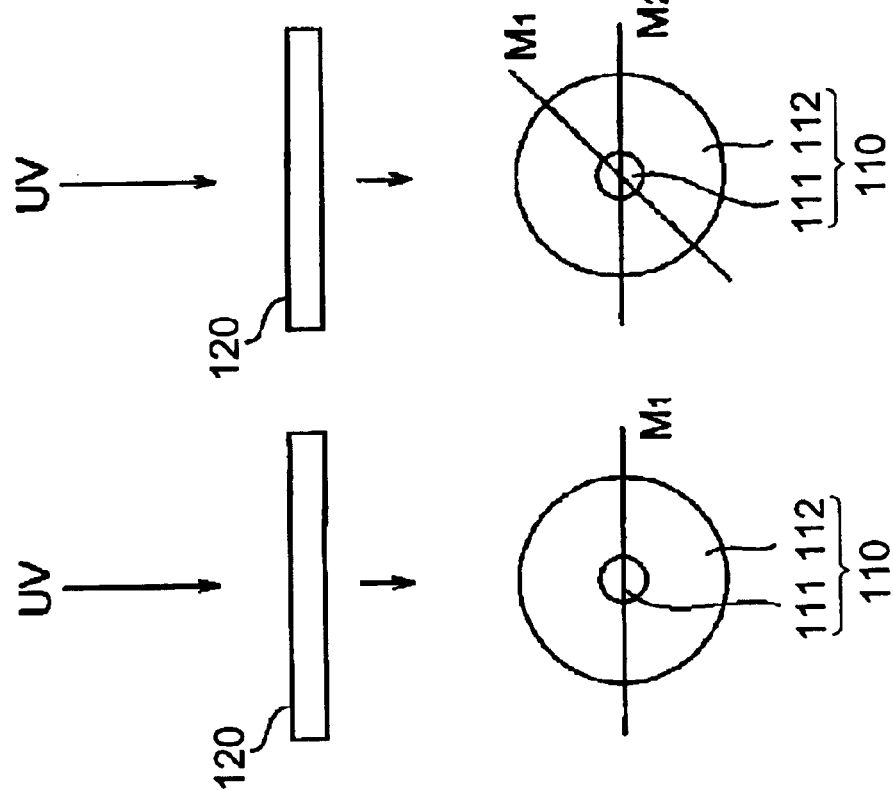

OPTICAL WAVEGUIDE TYPE DEFRACTION GRATING DEVICE AND A METHOD OF MANUFACTURING THEREOF

CROSS-REFERENCE TO THE RELATED APPLICATION

This application claims priority to Provisional Application Serial No. 60/340,484 filed Dec. 18, 2001, which is/are hereby incorporated by reference in its/their entirety.

BACKGROUND OF THE INVENTION

1. Field of the Invention

The present invention relates to an optical waveguide type filter in which a part in a longitudinal direction of an optical waveguide such as an optical fiber is formed with a periodically perturbation part having a periodic change in refractive index and the like, a method of making the same, and an optical fiber amplifier using the optical waveguide type filter.

2. Related Background Art

A long period type tilted optical fiber grating in which a part of an optical fiber is formed with a periodically perturbation part for refractive index having a relatively long period has been known from A. M. Vengsarkar, et al., "Long-Period Fiber Grating as Band-Rejection Filters," JOURNAL OF LIGHTWAVE TECHNOLOGY, VOL. 14, NO. 1, pp. 58–65, and the like.

On the other hand, a tilted optical fiber grating in which a part of an optical fiber is formed with a periodically perturbation part having a relatively short period such that a line perpendicular to a level plane thereof is tilted with respect to the optical axis of the optical fiber has been known from literatures such as R. Kashyap, et al., "WIDEBAND GAIN FLATTENED ERBIUM FIBRE AMPLIFIER USING A PHOTOSENSITIVE FIBRE BLAZED GRATING," ELECTRONICS LETTERS, Vol. 29, No. 2, pp. 154–156; and T. Erdogan, et al., "Radiation-mode coupling loss in tileted [sic] fiber phase graitings [sic]," OPTICS LETTERS, Vol. 20, No. 18, pp. 1838–1840.

Both of the long period type optical fiber grating and tilted optical fiber grating are based on an optical waveguide, and function as a wavelength selection type loss filter in a wavelength band of 1.5 μm and the like. When compared with an optical component having the same function, e.g., etalon, it is advantageous in that it can easily be connected to an optical waveguide such as an optical fiber while its insertion loss is low.

A long period type optical fiber grating is one in which a part of an optical fiber having a photosensitive dopant is irradiated with ultraviolet rays by use of a mask plate having a masking period of several hundreds of micrometers, so as to form the optical fiber with a refractive index perturbation part having a period of several hundreds of micrometers.

When a coating layer is disposed on the optical fiber in the long period type optical fiber grating, a leaky mode, which is formed on the whole cladding and is essential for exhibiting a function as a wavelength selection type loss filter, changes/disappears, thereby altering its cutoff spectrum. Therefore, the coating layer is hard to provide. When no coating layer is provided, however, the fear of damaging and breaking the optical fiber increases so much that its handling is not be easy. Also, the cutoff center wavelength in the long period type optical fiber grating is greatly influenced by its core/cladding refractive index difference. Since the core/cladding refractive index difference greatly varies depending on temperature, the cutoff center wavelength will vary if temperature changes.

On the other hand, the tilted optical fiber grating is considered to be in a mode more preferable as a wavelength selection type loss filter, since it does not have such demerits of the long period type optical fiber grating.

FIGS. 1A, 1B and 1C are views showing an example of tilted optical fiber grating (hereinafter referred to as "tilted FG"), in which FIG. 1A is a longitudinal sectional view, FIG. 1B is a lateral sectional view, and FIG. 1C is a perspective view. In FIGS. 1A, 1B and 1C, 1 is an optical fiber, 2 is a core, 3 is a cladding, 4 is a periodically perturbation part for refractive index, A is a line passing a given point O on the optical axis in the periodically perturbation part and being perpendicular to a level plane L passing the given point, X is the optical axis, Y is a deflection angle direction, L is a level plane, M is a plane, also referred to as a deflection angle plane, formed between the line A passing the given point O on the optical axis in the periodically perturbation part and being perpendicular to the level plane passing the given point and the optical axis X, O is the given point, and θ is the angle of inclination.

This tilted FG is one in which a part in a longitudinal direction of the optical fiber 1 comprising the core 2 and cladding 3 is formed with a part whose refractive index is periodically changed, i.e., periodically perturbation part 4. A plane yielding a fixed refractive index in the periodically perturbation part 4, i.e., the level plane L, is tilted from a plane perpendicular to the optical axis X of the optical fiber 1. Also, the line A perpendicular to the level plane L passing a given point O in the periodically perturbation part of the tilted FG is tilted with respect to the optical axis X, whereby the line A and the optical axis X form the angle of inclination θ.

Within the deflection angle plane M, a direction passing the point O and being perpendicular to the optical axis X is defined as the deflection angle direction Y. Therefore, all of the optical axis X, line A, and deflection angle direction Y are located within the polarization angle plane M.

In the conventionally known tilted FG, all the level planes L are parallel to each other even when the position of given point O varies within the periodically perturbation part 4. Therefore, even when the position of given point O in the periodically perturbation part 4 changes, the deflection angle plane M is fixed, and the deflection angle directions Y are always parallel to each other and oriented in the same direction.

Such a tilted FG is made as follows. FIGS. 2A and 2B are views showing a major part of a manufacturing method, in which FIG. 2A is a perspective view, whereas FIG. 2B is a side view. In FIGS. 2A, 2B and 2C, 5 is a phase grating mask, 6 is a grating surface, 7 is an excimer laser, and 8 is an ultraviolet ray. The optical fiber 1 including a photosensitive dopant such as germanium in the core 2 is arranged parallel to the phase grating mask 5 formed with the grating surface 6 made of several thousands to several tens of thousands of groove-like recesses/projections usually having a pitch of about 1 μm therebetween, and is irradiated with the ultraviolet rays 8 by way of the phase grating mask 5 by using the excimer laser 7. As a consequence, interference fringes of the ultraviolet rays 8 are generated by the grating surface 6 of the phase grating mask 5, and the optical fiber 1 is irradiated with the interference fringes. As the ultraviolet light source, not only the excimer laser but also argon lasers may be used.

Since the refractive index of the core 2 in the optical fiber 1 varies depending on whether the ultraviolet rays are strong or weak, the interference fringes of ultraviolet rays form the periodically perturbation part 4 for refractive index in the optical fiber 1. A normal optical fiber grating whose optical axis is perpendicular to the level planes of the periodically perturbation part 4 is obtained when the direction of grooves in the grating surface 6 is oriented in a direction perpendicular to the optical axis X of the optical fiber 1, whereas a so-called tilted FG in which a line perpendicular to the level planes of the periodically perturbation part 4 is tilted with respect to the optical axis is obtained when the direction of grooves of the grating surface 6 is tilted by about 5 degrees with respect to a direction perpendicular to the optical axis X of the optical fiber 1.

As mentioned above, using the tilted FG as a wavelength selection type loss filter is advantageous in that fluctuations in the cutoff center wavelength with respect to temperature changes are smaller than those in the long period optical fiber grating, and that its handling is easy since the coating layer can be provided on the optical fiber.

In the periodically perturbation part of the tilted FG in accordance with the prior art, however, the deflection angle direction is always oriented in a fixed direction, whereas its cutoff characteristic varies between the polarization in the deflection angle direction and the polarization in a direction perpendicular to the deflection angle direction, whereby its cutoff characteristic as a tilted FG is dependent on polarization. The dependence on polarization may be problematic in that, when the tilted FG is used in an optical fiber amplifier or the like, its gain may vary depending on the state of polarization of signal light.

SUMMARY OF THE INVENTION

The present invention provides an optical waveguide type filter using a tilted FG whose dependence on polarization is lowered, a method of making the same, and an optical fiber amplifier using the optical waveguide type filter.

In the optical waveguide type filter of the present invention, a part of an optical waveguide in a longitudinal direction thereof is provided with a periodically perturbation part for a periodic change in refractive index or the like, and a line perpendicular to a level plane of the periodically perturbation part is tilted with respect to the optical axis of the optical waveguide. Also, when made linear without twisting, the optical waveguide includes a portion where a plane formed by a line passing a given point on the optical axis in the periodically perturbation part and being perpendicular to a level plane passing the given point and the optical axis, i.e., deflection angle plane, varies depending on a position of the given point in the longitudinal direction thereof, whereby a part with a varied deflection angle direction is made in the longitudinal direction of the optical waveguide. As a consequence, the difference between respective cutoff characteristics with respect to the polarization in the deflection angle direction and the polarization in a direction perpendicular to the deflection angle direction is canceled in the longitudinal direction of the optical waveguide, whereby the dependence of cutoff characteristic on polarization is lowered.

The method of changing the deflection angle direction depending on the position in the longitudinal direction of the optical waveguide includes one comprising the steps of initially forming a tilted FG whose deflection angle direction does not vary in the longitudinal direction of the optical waveguide, and then twisting it about the optical axis of the optical waveguide so as to change the deflection angle in the longitudinal direction of the optical waveguide; and one comprising the steps of initially twisting a part of the optical waveguide about the optical axis, forming a tilted FG whose deflection angle direction does not vary in thus twisted part, and then untwisting it so as to change the deflection angle direction in the longitudinal direction of the optical waveguide.

An optical waveguide type filter whose deflection angle direction varies in the longitudinal direction can also be formed by a method comprising the steps of forming a plurality of tilted FGs whose deflecting angle direction does not vary in the longitudinal direction of the optical waveguide, rotating them about the optical axis with varied rotating angles such that their deflection angle directions differ from each other, and fusion-splicing them to each other so as to yield a single optical waveguide.

Further, an optical waveguide type filter whose deflection angle direction varies in the longitudinal direction can also be formed by a method comprising the steps of forming a part in the longitudinal direction of the optical waveguide with a periodically perturbation part whose deflection angle direction does not vary, forming a periodically perturbation part having a deflection angle direction different from that of the former periodically perturbation part by rotating the optical waveguide about the optical axis at a location longitudinally separated from the former periodically perturbation part, and repeating such an operation for a plurality of times, so as to form a plurality of periodically perturbation parts having respective deflection angle directions different from each other at respective locations in the longitudinal direction of the optical waveguide.

The optical waveguide type filter in accordance with the present invention formed as in the foregoing may be inserted in a circuit of an optical fiber amplifier having, at least, an erbium-doped optical fiber and a pumping laser light source, so as to act as a gain equalizer, whereby amplification spectral characteristics can be flattened in a large wavelength width.

The optical waveguide type diffraction grating device in accordance with another aspect of the present invention is characterized in that, in N refractive index modulated parts, respective lines perpendicular to refractive index level planes form the same angle with the optical axis of the optical waveguide, respective forming areas have the same length along the longitudinal direction of the optical waveguide, respective refractive index modulation periods are the same, and respective refractive index modulation amplitudes are the same. The method of making an optical waveguide type diffraction grating device in accordance with another aspect of the present invention is characterized in that the N refractive index modulated parts are formed such that respective lines perpendicular to refractive index level planes form the same angle with the optical axis of the optical waveguide, respective forming areas have the same length along the longitudinal direction of the optical waveguide, respective refractive index modulation periods are the same, and respective refractive index modulation amplitudes are the same. The optical waveguide type diffraction grating device becomes one whose polarization-dependent loss is efficiently reduced in this case as well.

The optical waveguide type diffraction grating device in accordance with another aspect of the present invention is characterized in that a polarization-dependent loss at a wavelength yielding the maximum transmission loss is not greater than $\frac{1}{100}$ of the maximum transmission loss value. In this case, the optical waveguide type diffraction grating device is favorably used as an optical apparatus (or a part thereof) which is required to have a low polarization-dependent loss in the field of optical communications.

The method of making an optical waveguide type diffraction grating device in accordance with another aspect of the present invention is characterized in that each of the N refractive index modulated parts is formed while monitoring a transmission loss. Alternatively, it is characterized in that each of the N refractive index modulated parts is formed while monitoring a polarization-dependent loss. In this case, the optical waveguide type diffraction grating device made thereby becomes one whose polarization-dependent loss is efficiently reduced.

BRIEF DESCRIPTION OF THE DRAWINGS

FIGS. 1A, 1B and 1C are views showing an example of tilted optical fiber grating in accordance with prior art, in which FIG. 1A is a longitudinal sectional view, FIG. 1B is a lateral sectional view, and FIG. 1C is a perspective view.

FIGS. 2A and 2B are views showing a major part of a method of making a tilted optical fiber grating (tilted FG), in which FIG. 2A is a perspective view, whereas FIG. 2B is a side view.

FIGS. 3A and 3B are views for showing the first embodiment of the optical waveguide type filter of the present invention, in which FIG. 3A is a longitudinal sectional view, whereas FIG. 3B shows respective lateral sectional views at individual positions of P, Q, R, S.

FIGS. 4A and 4B are views showing the state of twisting at the time of making an optical waveguide type filter of the first embodiment in accordance with the present invention, in which FIG. 4A is a longitudinal sectional view, whereas FIG. 4B shows respective lateral sectional views at individual locations.

FIGS. 6A and 6B are views showing the second embodiment of the optical waveguide type filter of the present invention, in which FIG. 6A is a longitudinal sectional view, whereas FIG. 6B shows respective lateral sectional views at individual positions in the longitudinal direction of the optical fiber.

FIGS. 7A and 7B are views showing the third embodiment of the optical waveguide type filter of the present invention, in which FIG. 7A is a longitudinal sectional view, whereas FIG. 7B shows respective lateral sectional views at individual positions in the longitudinal direction of the optical fiber.

FIGS. 10A and 10B are views showing the optical waveguide type filter of the present invention indicated in Example 5, in which FIG. 10A is a longitudinal sectional view, whereas FIG. 10B shows respective lateral sectional views at individual positions in the longitudinal direction of the optical fiber.

FIG. 11 is a graph showing characteristics of the optical waveguide type filter shown in FIG. 10.

FIGS. 12A and 12B are views showing the optical waveguide type filter having four periodically perturbation parts at respective locations in accordance with the present invention indicated in Example 6, in which FIG. 12A is a longitudinal sectional view, whereas FIG. 12B shows respective lateral sectional views at the periodically perturbation parts.

FIG. 13 is a graph showing characteristics of the optical waveguide type filter in accordance with FIGS. 12A and 12B and the relative gain value in an optical fiber amplifier using the same.

FIGS. 16A, 16B, 16C and 16D are sectional views for explaining the method of making an optical waveguide type diffraction grating device in accordance with the embodiment shown in FIG. 15.

FIG. 17A is a graph showing a transmission characteristic at the time when the first refractive index modulated part is completely formed, whereas FIG. 17B is a graph showing a transmission characteristic at the time when the second refractive index modulated part is completely formed.

DETAILED DESCRIPTION OF THE PREFERRED EMBODIMENTS

Figure 3A:
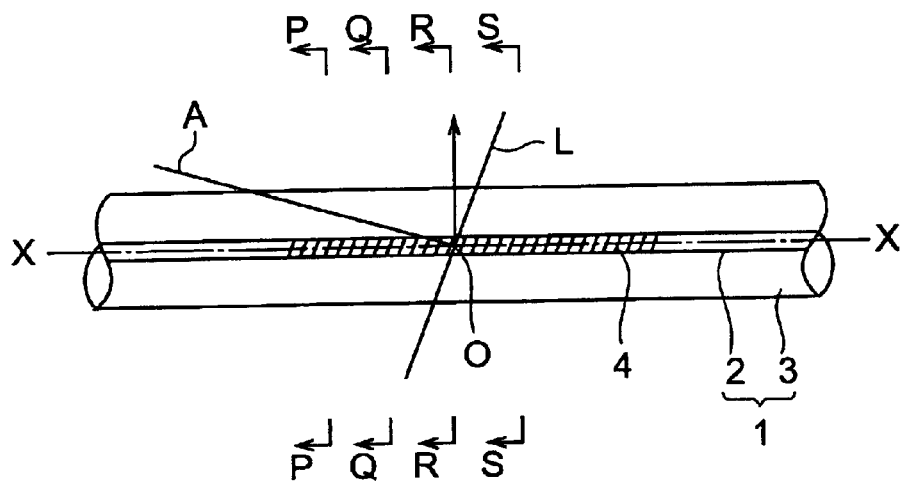
Figure 3B:
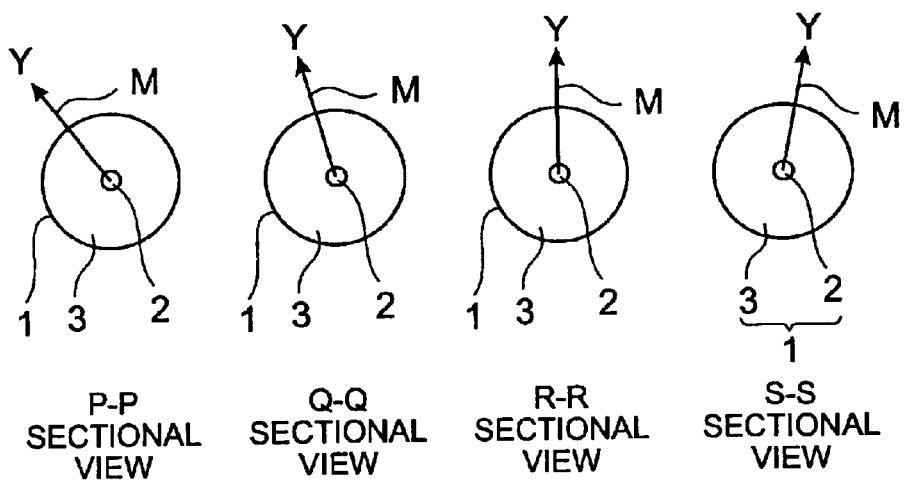

In the following, embodiments of the present invention will be explained in detail with reference to the accompanying drawings. In the explanation of the drawings, constituents identical to each other will be referred to with numerals or letters identical to each other without repeating their FIGS. 3A and 3B are views showing an embodiment of the optical waveguide type filter of the present invention, in which FIG. 3A is a longitudinal sectional view, whereas FIG. 3B shows respective lateral sectional views at positions of P, Q, R, S. Here, 1 is an optical fiber, 2 is a core, 3 is a cladding, 4 is a periodically perturbation part, A is a line passing a given point 0 on the optical axis in the periodically perturbation part and being perpendicular to a level plane L passing the given point, L is a level plane, M is a plane, also referred to as polarization angle plane, formed by a line A passing the given point 0 on the optical axis in the periodically perturbation part and being perpendicular to the level plane L passing the given point and the optical axis X, 0 is a given point on the optical axis in the periodically perturbation part, X is the optical axis, and Y is a polarization angle direction.

In this optical waveguide type filter, the inclination of the polarization angle plane M in the periodically perturbation part 4 varies depending on the position in the longitudinal direction of the optical fiber 1, whereby the deflection angle direction Y rotates about the optical axis X in the longitudinal direction of the optical fiber 1. Therefore, the envelope formed by deflection angle directions Y is a spirally curved surface. In the case of this optical waveguide type filter, the angle of change in deflection angle direction Y about the optical axis is the largest between both ends of the periodically perturbation part. The maximum angle of change in deflection angle direction Y is preferably 90 degrees in order to reduce the dependence on polarization. When the shifting by 90 degrees is difficult because of restrictions such as twisting of the optical fiber, however, the angle is set to at least 45 degrees, at least 60 degrees whenever possible.

Figure 2A:
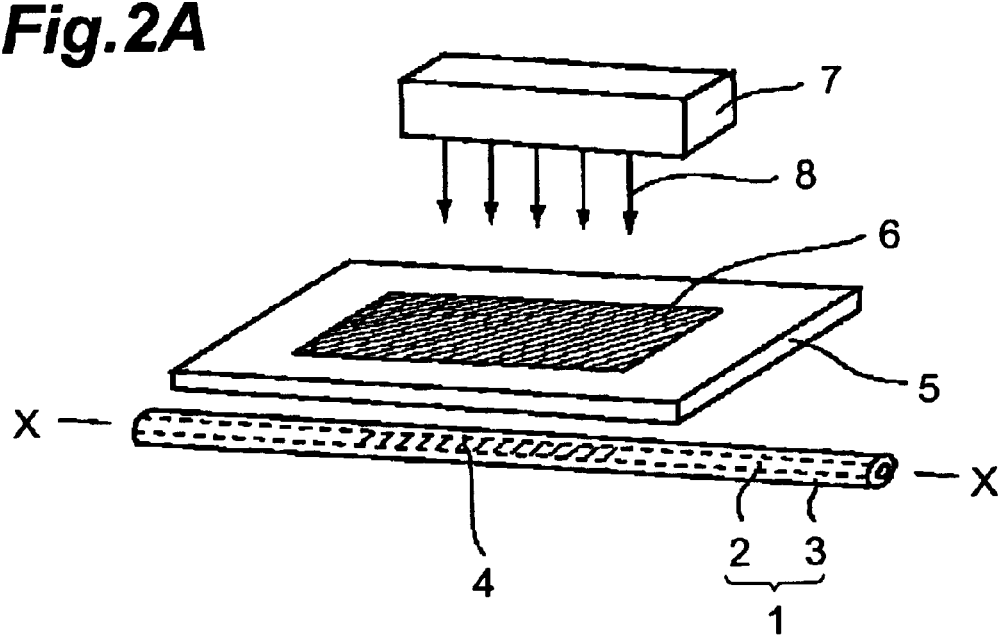
Figure 2B:
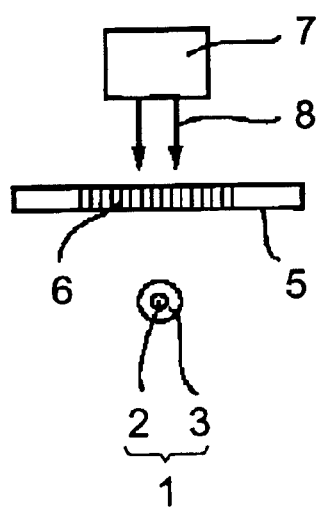

The optical waveguide type filter shown in FIGS. 3A and 3B can be made by use of the manufacturing apparatus shown in FIGS. 2A and 2B. In FIGS. 2A and 2B, an optical fiber 1 is arranged while being twisted about the optical axis, and is formed with a periodically perturbation part 4 for refractive index in a tilted fashion. In this state, even when the position in the longitudinal direction of the optical fiber varies, the deflection angle direction of the periodically perturbation part is always oriented in one direction, and the deflection angle plane is located on one plane. After the periodically perturbation part is formed, the twisting of the optical fiber 1 about the optical axis is released, so as to return to the untwisted state. As a consequence, the deflection angle direction of the periodically perturbation part attains a state rotated about the optical axis in the longitudinal direction of the optical fiber, and the deflection angle plane fails to keep a state located on one plane but attains a state in which the plane is rotated in the longitudinal direction, whereby the optical waveguide type filter shown in FIGS. 1 is formed.

Also, a tilted FG made by the method of prior art according to FIGS. 2A and 2B may be twisted and then secured with a securing member such as a sleeve so as not to be untwisted, whereby one having a function similar to that of the optical waveguide type filter of the present invention shown in FIGS. 3A and 3B can be formed.

Figure 4A:
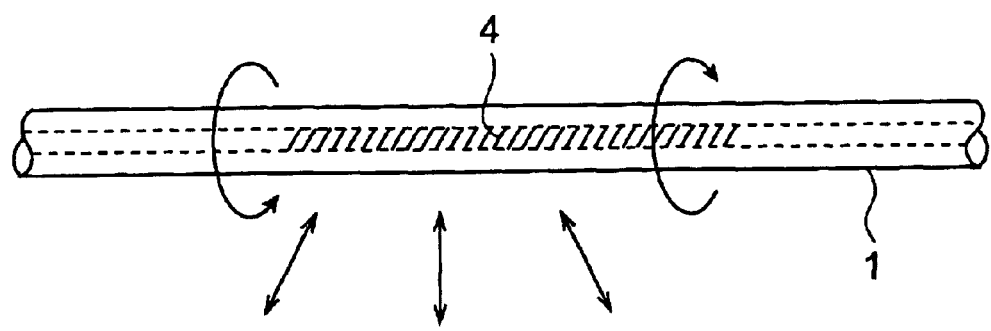
Figure 4B:
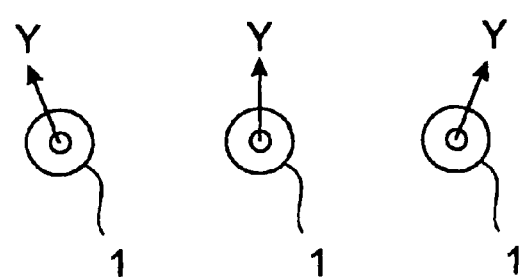
Figure 5:
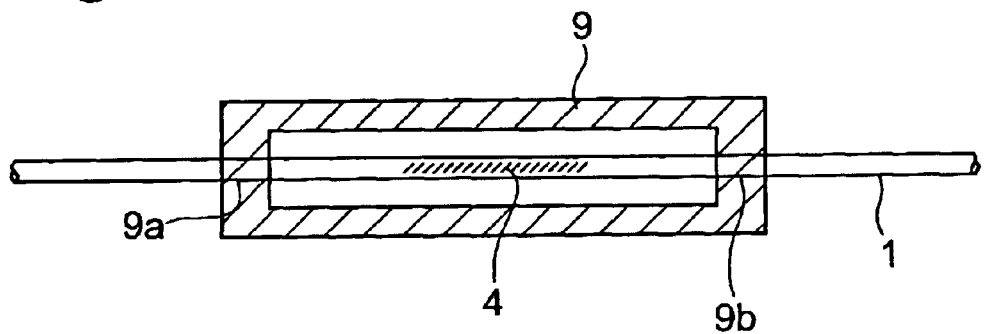
FIG. 5 is a longitudinal sectional view showing a method of securing the optical waveguide type filter made by the method shown in FIG. 2.

FIGS. 4A and 4B are views showing the state of twisting in that case, in which FIG. 4A is a longitudinal sectional view, whereas FIG. 4B shows respective lateral sectional views at individual locations. As shown in FIG. 4A, upon twisting about the optical axis, the deflection angle direction Y varies depending on the position in the longitudinal direction of the optical fiber 1. FIG. 5 is a longitudinal sectional view showing a method of securing the optical waveguide type filter made by the above-mentioned method. In the optical waveguide type filter shown in FIG. 3, the part of twisted optical fiber 1 formed with the periodically perturbation part 4 is accommodated in a cavity of a securing member 9, and is fixed to the securing member 9 at penetrating positions 9a, 9b of the securing member, so that the optical fiber 1 is not untwisted. The cavity of the securing member 9 may be filled with a resin or the like.

If the optical fiber is twisted while monitoring the polarization-dependent loss of the optical fiber, and is secured so as not to be untwisted at the time when the polarization-dependent loss is minimized, an optical waveguide filter having a low polarization-dependent loss can be made more reliably.

FIGS. 6A and 6B are views showing another embodiment of the optical waveguide type filter in accordance with the present invention, in which FIG. 6A is a longitudinal sectional view, whereas FIG. 6B shows respective lateral sectional views at individual positions in the longitudinal direction of the optical fiber. In the optical waveguide type filter of FIGS. 4, respective periodically perturbation parts 4a, 4b, 3c are formed at three locations in the longitudinal direction of a single optical fiber 1. Though the deflection angle direction Y is oriented in a fixed direction with in each of the periodically perturbation parts 4a, 4b, 4c, the deflection angle direction Y varies among the periodically perturbation parts 4a, 4b, 4c.

For making such an optical waveguide type filter, according to the method shown in FIGS. 2A and 2B, a part of an optical fiber 1 is initially formed with a periodically perturbation part 4a, then the ultraviolet irradiating position is changed while the optical fiber 1 is rotated by a predetermined angle about the optical axis, so as to form a next periodically perturbation part 4b. Such an operation is repeated, so as to form another periodically perturbation part 4c, where by the deflection angle direction Y can be changed among the periodically perturbation parts 4a, 4b, 4c.

Though FIGS. 6A and 6B show an example in which the number of periodically perturbation parts is 3, the number of periodically perturbation parts may be N, while the respective deflection angle directions of the periodically perturbation parts may be shifted from each other at intervals of 90 degrees/(N−1), whereby an optical waveguide type filter having a low dependence on polarization can be constructed. When arranging N periodically perturbation parts, it is not necessary for the order of arrangement of deflection angle directions to be specified in particular. Also, the intervals between a plurality of periodically perturbation parts may be variable, and it is not always necessary for the period of periodically perturbation parts and the magnitude of fluctuations to be constant.

FIGS. 7A and 7B are views showing another embodiment of the optical waveguide type filter of the present invention, in which FIG. 7A is a longitudinal sectional view, whereas FIG. 7B shows respective lateral sectional views at individual positions in the longitudinal direction of the optical fiber. In the optical waveguide type filter of FIGS. 6A and 6B, optical fibers 1a, 1b, 1c are respectively formed with periodically perturbation parts 4a, 4b, 4c according to the method shown in FIGS. 13 as in the tilted FG in accordance with the prior art in which the refractive index and the like are changed. The deflection angle direction within the periodically perturbation parts 4a, 4b, 4c is oriented in a constant direction.

Thereafter, the optical fibers 1a, 1b, 1c are arranged in series, and are rotated about the optical axis with varied rotating angles such that their deflection angle directions differ from each other. Then, their end faces are butted against one another, and their butted portions 10a, 10b are fusion-spliced. In the case of this optical waveguide filter, though FIGS. 7A and 7B show one in which three optical fibers are fusion-spliced together, the number of optical fibers may be N while the respective deflection angle directions of periodically perturbation parts maybe shifted from each other at intervals of 90 degrees/(N−1), whereby an optical waveguide type filter having a low dependence on polarization can be constructed. When arranging N periodically perturbation parts, it is not necessary for the order of arrangement of deflection angle directions to be specified in particular.

Figure 8:
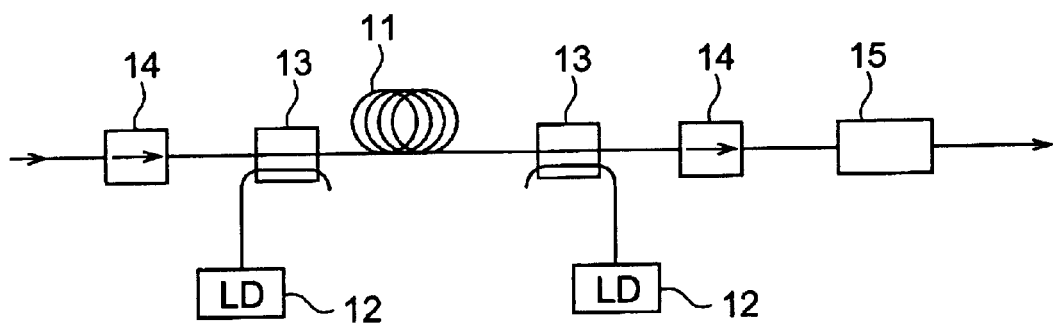
FIG. 8 is a a view showing an example of optical fiber amplifier using an optical waveguide type filter of the present invention.

FIG. 8 is a view showing an example of an optical fiber amplifier using an optical waveguide type filter of the present invention, in which 11 is an erbium-doped optical fiber, 12 is a pumping laser light source, 13 is a coupler, 14 is an isolator, and 15 is an optical waveguide type filter. Though the optical waveguide type filter 15 is inserted on the output side of one stage of optical fiber amplifier so as to function as a gain equalizer in this optical fiber amplifier, an optical waveguide type filter can be inserted in the middle of a plurality of stages of optical fiber amplifiers. Also, an optical waveguide type filter can be inserted between an erbium-doped optical fiber and a coupler where pumping light flows, so as to eliminate unnecessary pumping light.

While one in which refractive index is periodically changed in an optical fiber comprising a core and a cladding so as to form a periodically perturbation part is explained as an optical waveguide type filter of the present invention in the foregoing, the periodically perturbation part of the optical fiber is not limited to one periodically changing the refractive index. The core may periodically change its outer diameter and the like, so that it can function as a wavelength selection type loss filter. Also, an appropriate coating can be provided on the optical fiber so as to protect it. Further, the present invention is applicable to optical waveguides other than the optical fiber, such as planar waveguides, by forming a core with a periodically perturbation part and changing its deflection angle direction.

Here, an optical waveguide type filter according to the present invention was actually manufactured and the results confirmed. "Example 1" and "Comparative Example": Using a stepped index type optical fiber having a relative refractive index difference of 0.35%, a core diameter of 8 $\mu$m, a cladding diameter of 125 $\mu$m, a core material of $GeO_2 \cdot SiO_2$, and a cladding material of $SiO_2$, 2 weeks of preprocessing were carried out at room temperature in a hydrogen atmosphere at 200 atmospheres, whereby an optical fiber was prepared. By way of a phase grating mask, thus prepared optical fiber was irradiated with ultraviolet rays having a wavelength of 248 nm from an excimer laser. As the phase grating mask, one having a grating pitch of 1.073 to 1.075 $\mu$m and a length of 5 mm was used, and was set such that the direction of grooves of the phase grating mask was tilted by 5 degrees with respect to a direction perpendicular to the optical axis of the optical fiber. The irradiation with ultraviolet rays was stopped at the time when the cutout amount of transmission wavelength was 3 dB.

One in which thus finished optical fiber was kept as it was, i.e., without twisting, (defined as Comparative Example), and one in which the optical fiber was provided with one rotation of twisting per 30 mm and then secured to a securing member so as not to be untwisted (defined as Example 1) were prepared, and the polarization-dependent loss (hereinafter abridged as "PDL") and cutout amount were measured in each of them. The results are as shown in FIG. 7. While both of them yielded the same cutout amount, PDL in Comparative Example was the value indicated by broken curve, whereas that in Example 1 was the value indicated by solid curve. It was seen from these results that, while the one in Comparative Example in accordance with the prior art without twisting yielded the maximum PDL value of 0.25 dB, the maximum PDL value of Example 1 in accordance with the present invention provided with twisting was greatly improved to 0.06 dB.

"Example 2": Using an optical fiber identical to that of the above-mentioned Example 1 before irradiation, the optical fiber was arranged parallel to the phase grating mask while being twisted at a rate of one rotation per 30 mm, and was irradiated with ultraviolet rays. The phase grating mask and excimer laser identical to those of Example 1 were used. The irradiation with ultraviolet rays was stopped at the time when the cutout amount was 3 dB. After the irradiation, the optical fiber was untwisted to the original state. When the cut out amount and PDL of the optical waveguide filter were measured, the cutout amount was 3 dB, whereas the maximum PDL value was 0.05 dB, whereby it was seen that the PDL was greatly improved as compared with that of the above-mentioned Comparative Example in accordance with the prior art.

"Example 3": Using an optical fiber identical to that of the above-mentioned Example 1 before irradiation, the optical fiber was irradiated by way of the phase grating mask according to the same method as that of the above-mentioned Example 1. The irradiation with ultraviolet rays was once stopped at the time when the cutout amount was 1.5 dB. After the irradiating position for the optical fiber was shifted by 15 mm, the optical fiber was rotated by 90 degrees about the optical axis and then was irradiated with ultraviolet rays again. At the time when the cutout amount was 3 dB, the irradiation with ultraviolet rays was stopped. When the cutout amount and PDL of the optical waveguide filter were measured, the cutout amount was 3 dB, whereas the maximum PDL value was 0.01 dB, whereby it was seen that the PDL was greatly improved as compared with that of the above-mentioned Comparative Example in accordance with the prior art, so as to become lower than that in Examples 1 and 2.

"Example 4": Two optical fibers, each being identical to that of the optical fiber of the above-mentioned Example 1 after irradiation, were prepared, one of them was rotated about the optical axis such that their deflection angle directions were shifted from each other by 90 degrees about the optical axis, and they were fusion-spliced to each other at their butted portions. When the cutout amount and PDL of the optical waveguide filter were measured, the cutout amount was 6 dB, whereas the maximum PDL value was 0.1 dB, whereby it was seen that the PDL was improved so as to become ½ or less of that in Comparative Example in accordance with the prior art.

"Example 5": Two optical fibers, each being identical to that of the optical fiber of the above-mentioned Example 1 after irradiation, were prepared and irradiated with respective phase grating masks different from each other. As the phase grating masks, one having a grating pitch of 1.073 to 1.075 $\mu$m and a length of 5 mm, and one having a grating pitch of 1.077 to 1.079 $\mu$m and a length of 5 mm were prepared and used for the respective optical fibers. Here, each phase grating mask was tilted by 5 degrees. The irradiation with ultraviolet rays was stopped at the time when the cutout amount was 3 dB in each case. The excimer laser identical to that in Example 1 was used. One of thus formed two optical fibers was rotated about the optical axis such that their deflection angle directions were shifted from each other by 90 degrees about the optical axis, and they were fusion-spliced to each other at their butted portions.

Figure 9:
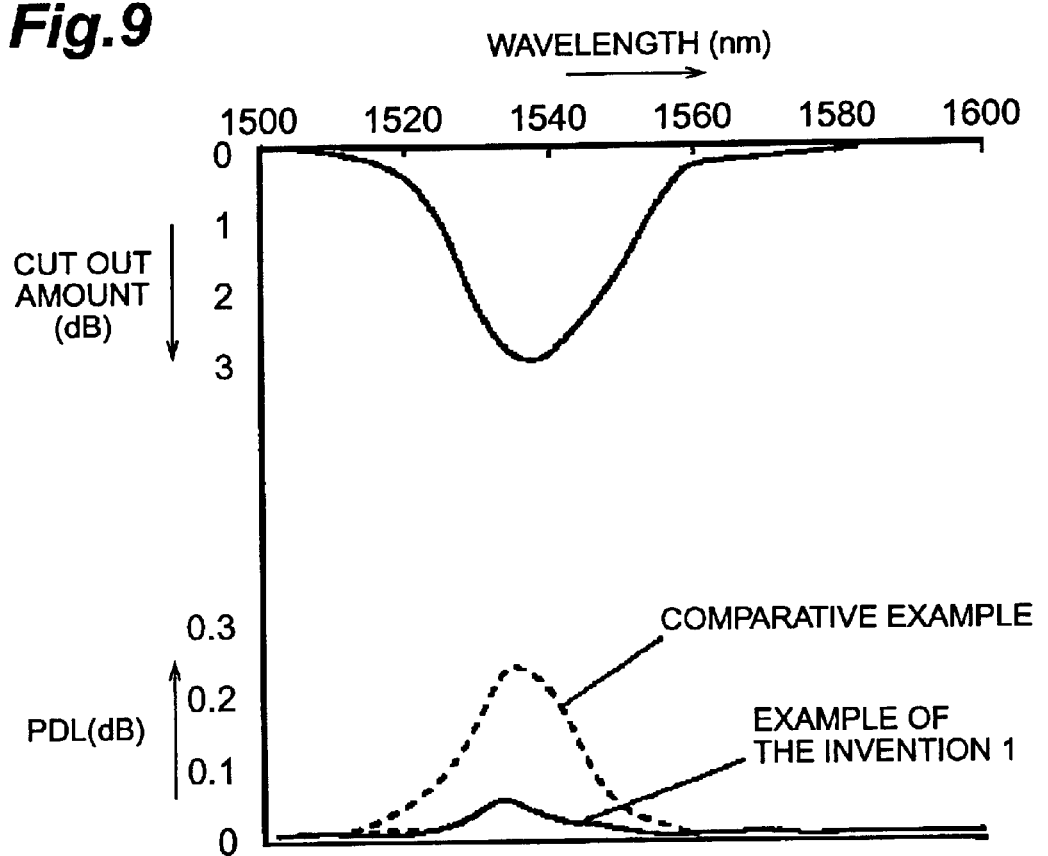
FIG. 9 is a graph showing characteristics of Example 1 of the present invention and Comparative Example.

FIGS. 10A and 10B are views showing thus obtained optical waveguide type filter, in which FIG. 10A is a longitudinal sectional view, whereas FIG. 10B shows respective lateral sectional views of periodically perturbation parts 16a, 16b of the optical fibers. The periodically perturbation parts 16a, 16b are parts irradiated with ultraviolet rays by way of their corresponding phase grating masks, where as their deflection angle directions Y are shifted from each other by 90 degrees about the optical axis. Here, 17 is a fusion-spliced butted portion. FIG. 9 is a graph showing the results of the cutout amount and PDL in this optical waveguide type filter, in which the cutout amount was 5.2 dB, and the maximum PDL value was 0.11 dB. As compared with Comparative Example 4, it is seen that, even when the grating pitch of phase grating mask is changed, PDL hardly varies although the cutout amount slightly decreases.

"Example 6": Using an optical fiber identical to that of the above-mentioned Example 1 before irradiation, the optical fiber was irradiated with ultraviolet rays at four locations in the longitudinal direction thereof by way of a phase grating mask, so as to form respective periodically perturbation parts. At the first two locations, a phase grating mask having a grating pitch of 1.064 to 1.068 $\mu$m and a length of 5 mm was used, and the optical fiber was irradiated with ultraviolet rays by way of the phase grating mask tilted by 5 degrees. At the first location, the optical fiber was once irradiated with ultraviolet rays at a cutout amount of 3 dB. At the second location where the optical fiber was shifted by 10 mm, the optical fiber was rotated by 90 degrees about the optical axis and irradiated with ultraviolet rays. Here, the irradiation with ultraviolet rays was stopped at the time when the cutout amount was 6 dB.

Thereafter, at a third location where the optical fiber was further shifted by 10 mm, the phase grating mask was changed to one having a grating pitch of 1.080 to 1.084 $\mu$m and a length of 5 mm, and the optical fiber was irradiated with ultraviolet rays by way of the phase grating mask tilted by 5 degrees. The irradiation with ultraviolet rays at the third location was stopped at a cutout amount of 0.7 dB. Further, the optical fiber was shifted by 10 mm, rotated by 90 degrees, and irradiated with ultraviolet rays by using the same phase grating mask until the cutout amount became 1.4 dB. Here, the excimer laser was identical to that used in Example 1.

Figure 12A:
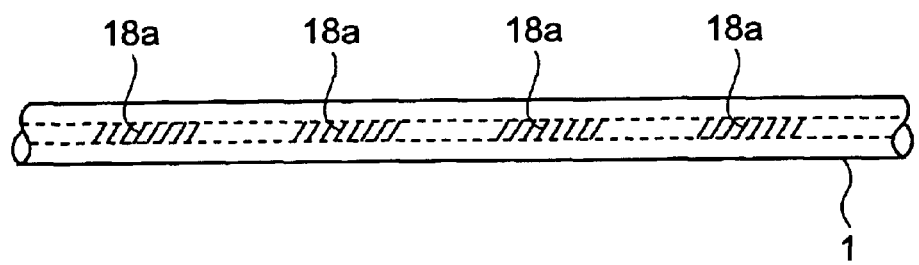
Figure 12B:
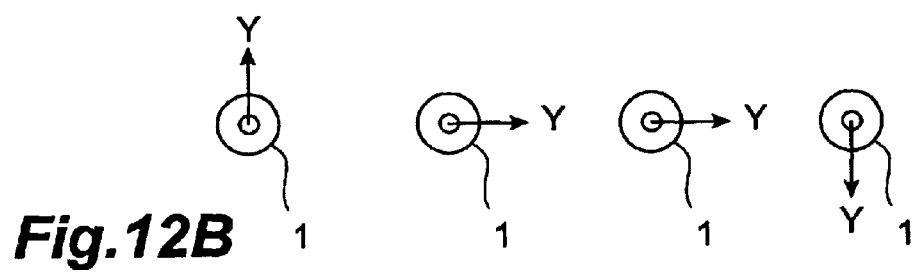

FIGS. 12A and 12B are views showing the optical waveguide type filter made as mentioned above, in which FIG. 12A is a longitudinal sectional view, whereas FIG. 12B shows respective lateral sectional views in the individual periodically perturbation parts. Here, 18a, 18b, 18c, 18d show the respective periodically perturbation parts at the first to fourth locations, respectively.

When characteristics of thus obtained optical waveguide type filter having respective periodically perturbation parts at four locations were measured, as shown in FIG. 11, the cutout amount had a peak of 6 dB near 1530 nm and a peak of 1.4 dB near 1555 nm, whereas the maximum PDL value was 0.01 dB.

Further, the aforementioned embodiment was explained with a limitation on the direction of irradiation of ultraviolet light. However, any direction of illumination is possible.

Also, using the optical waveguide filter of Example 6, the optical fiber amplifier shown in FIG. 8 was constructed. As the pumping laser light source, one having a wavelength of 1.48 $\mu$m was used. FIG. 13 is a graph showing characteristics of the optical waveguide type filter and relative gain values upstream and downstream the optical waveguide type filter, where the broken curve of relative gain value indicates the value obtained before the optical waveguide filter is inserted, whereas the solid curve indicates the value obtained before the optical waveguide filter is inserted. As can be seen from the value of solid curve, the gain spectrum can be flattened in a wavelength band of 20 nm or wider when the optical waveguide type filter of the present invention is inserted.

The optical waveguide type filter of the present invention is one in which a periodically perturbation part is tilted with respect to the optical axis, while having a portion where a plane formed by the optical axis and a line perpendicular to the level plane, i.e., deflection angle plane, varies depending on a position in the longitudinal direction of the optical waveguide, whereby the difference between respective cutout characteristics with respect to the polarization in the deflection angle direction and the polarization in a direction perpendicular to the deflection angle direction is canceled in the longitudinal direction of the optical waveguide, whereby it can become a wavelength selection type loss filter having a cutout characteristic whose dependence on polarization is low.

A method of changing the deflection angle direction depending on a position in the longitudinal direction of the optical waveguide includes a method comprising the steps of initially forming a tilted FG whose deflection angle direction does not vary, and twisting it in the longitudinal direction of the optical waveguide so as to change the deflection angle direction in the longitudinal direction of the optical waveguide; and a method comprising the steps of initially twisting a part of the optical waveguide, forming thus twisted part with a tilted FG whose deflection angle direction does not vary, and then untwisting the twisted part to the original state so as to change the deflection angle direction in the longitudinal direction of the optical waveguide. To each of these manufacturing methods, the method of making a tilted FG in accordance with the prior art is applicable without greatly altering it.

The optical waveguide type filter of the present invention in which the deflection angle direction varies in the longitudinal direction can also be formed by a method comprising the steps of preparing a plurality of tilted FGs whose deflection angle direction does not vary in the longitudinal direction thereof, rotating them about the optical axis with varied rotating angles such that their reflection angle directions differ from each other, and fusion-splicing them to each other so as to yield a single optical waveguide. This method can form an optical waveguide type filter exhibiting a greater change in the deflection angle direction and a smaller dependence on polarization as compared with the case where the optical fiber is twisted about the optical axis.

Further, the optical waveguide type filter whose deflection angle direction varies in the longitudinal direction can be formed by a method comprising the steps of forming a part in the longitudinal of an optical waveguide with a periodically perturbation part whose deflection angle direction does not vary in the longitudinal direction, rotating the optical waveguide about the optical axis at a location longitudinally separated from the above-mentioned part so as to form a periodically perturbation part having a deflection angle direction different from that of the former periodically perturbation part, and repeating such an operation for a plurality of times so as to form a plurality of periodically perturbation parts having respective deflection angle directions different from each other at respective locations in the longitudinal direction of the optical waveguide. This method can form an optical waveguide type filter having a very low dependence on polarization, since it can enhance deviations in deflection angle direction without fusion-splicing.

Also, the optical waveguide type filter in accordance with the present invention can be inserted in a circuit of an optical fiber amplifier so as to act as a gain equalizer, thereby flattening spectral characteristics in a large wavelength width.

The second embodiment in accordance with the present invention will now be explained.

In the further embodiments of the present invention to be described below, identical elements in the explanation of the drawings are allotted identical numerals, and repeated explanations are omitted.

Figure 14:
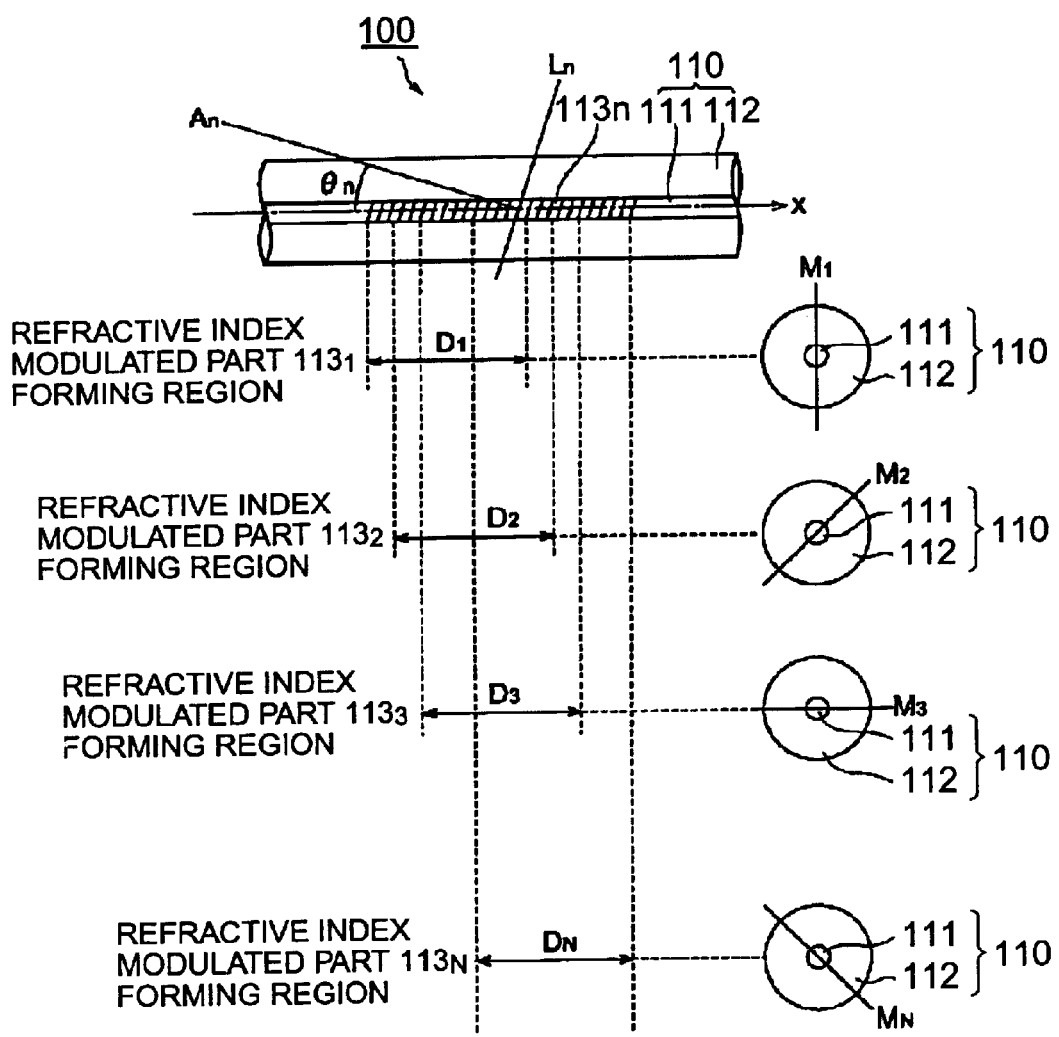
FIG. 14 is a an explanatory view of the optical waveguide type diffraction grating device (tilt type diffraction grating device) in accordance with the fourth embodiment of the present invention.

FIG. 14 is an explanatory view of the optical waveguide type diffraction grating device (tilt type diffraction grating device) 100 in accordance with the fourth embodiment. This drawing shows a sectional view cut along a plane including the optical axis, and sectional views cut along planes perpendicular to the optical axis. The tilt type diffraction grating device 100 in accordance with this embodiment shown in the drawing is one in which N (N being an integer not smaller than 2) refractive index modulated parts $113_1$, to $113_N$ are formed along the longitudinal direction of an optical fiber 110 which is an optical waveguide. The optical fiber 110 is based on silica glass, and includes a core region 11 doped with $GeO_2$, and a cladding region 112 surrounding the core region 111.

For each refractive index modulated part $113_n$ (n being a given integer of at least 1 but not greater than N), $L_n$, is a refractive index level plane yielding the same refractive index, $A_n$ is a line, perpendicular to the refractive index level plane $L_n$, intersecting the optical axis (x axis) of the optical fiber 110, $\theta_n$ is the angle formed between the line $A_n$ and the optical axis, and $M_n$ is the deflection angle plane formed by the line $A_n$ and the optical axis.

In each refractive index modulated part $113_n$, the line $A_n$ is not parallel to the optical axis, whereas the angle $\theta_n$ formed between the line $A_n$, and the optical axis is not zero. Namely, each refractive index modulated part $113_n$, is one in which a refractive index modulation having a period $A_n$ is formed in the core region 111 along the line $A_n$ inclined by the angle $\theta_n$ with respect to the optical axis. The respective deflection angle planes $M_n$ of refractive index modulated parts $113_n$ do not coincide with each other. Namely, in given two refractive index modulated parts $113_{n1}$, $113_{n2}$ of the N refractive index modulated parts $113_1$ to $113_N$, their respective deflection angle planes $M_{n1}$, $M_{n2}$ do not coincide with each other.

In the N refractive index modulated parts $113_1$, to $113_n$, two refractive index modulated parts $113_{n1}$, $113_{n2}$ have forming areas overlapping each other at least partially. In the drawing, for example, the forming area of the refractive index modulated part $113_1$, partially overlaps the forming area of there fractive index modulated part $113_2$, the forming area of the refractive index modulated part $113_3$, and the forming area of the refractive index modulated part $113_N$. Preferably, all the respective forming areas of the N refractive index modulated parts $113_1$, to $113_N$ coincide with each other.

Thus, the tilt type diffraction grating device 100 in accordance with the fourth embodiment is formed with N refractive index modulated parts $113_1$ to $113_N$, the angle $\theta_n$ of each refractive index modulated part $113_n$, is not zero, the respective deflection angle planes $M_n$ of refractive index modulated parts $13_n$ do not coincide with each other, and given two refractive index modulated parts $113_{n1}$, $113_{n2}$ have respective forming areas overlapping each other at least partially. Thus configured tilt type diffraction grating device 100 is a short one whose polarization-dependent loss is reduced.

Preferably, the respective deflection angle planes $M_1$ to $M_N$ of the N refractive index modulated parts $113_1$ to $113_N$ shift from each other at intervals of 180 degrees/N about the optical axis of the optical fiber 10. When N=2, for example, the deflection angle planes $M_1$ and $M_2$ are orthogonal to each other. When N=3, for example, the deflection angle planes $M_1$ to $M_3$ shift from each other at intervals of 60 degrees about the optical axis of the optical fiber 110. When the deflection angle planes $M_1$ to $M_N$ are arranged as such, the polarization-dependent loss is efficiently reduced in the tilt type diffraction grating device 100.

Preferably, in the N refractive index modulated parts $113_1$ to $113_N$, lines $A_n$ form the same angle $\theta_n$ with the optical axis, respective forming areas have the same length $D_n$ along the longitudinal direction of the optical fiber 110, respective refractive index modulation periods are the same, and respective refractive index modulation amplitudes are the same. When each refractive index modulated part $113_n$ is formed as such, the polarization-dependent loss is efficiently reduced in the tilt type diffraction grating device 100.

Preferably, at a wavelength yielding the maximum transmission loss, the polarization-dependent loss of the tilt type diffraction grating device 100 in accordance with this embodiment is not greater than $\frac{1}{10}$ of the transmission loss maximum value. Such a tilt type diffraction grating device 100 is favorably used as an optical apparatus (or a part thereof) which is required to have a low polarization-dependent loss in the field of optical communications, and can favorably be used as a gain equalizer for equalizing the gain of an optical fiber amplifier, for example.

Figure 15:
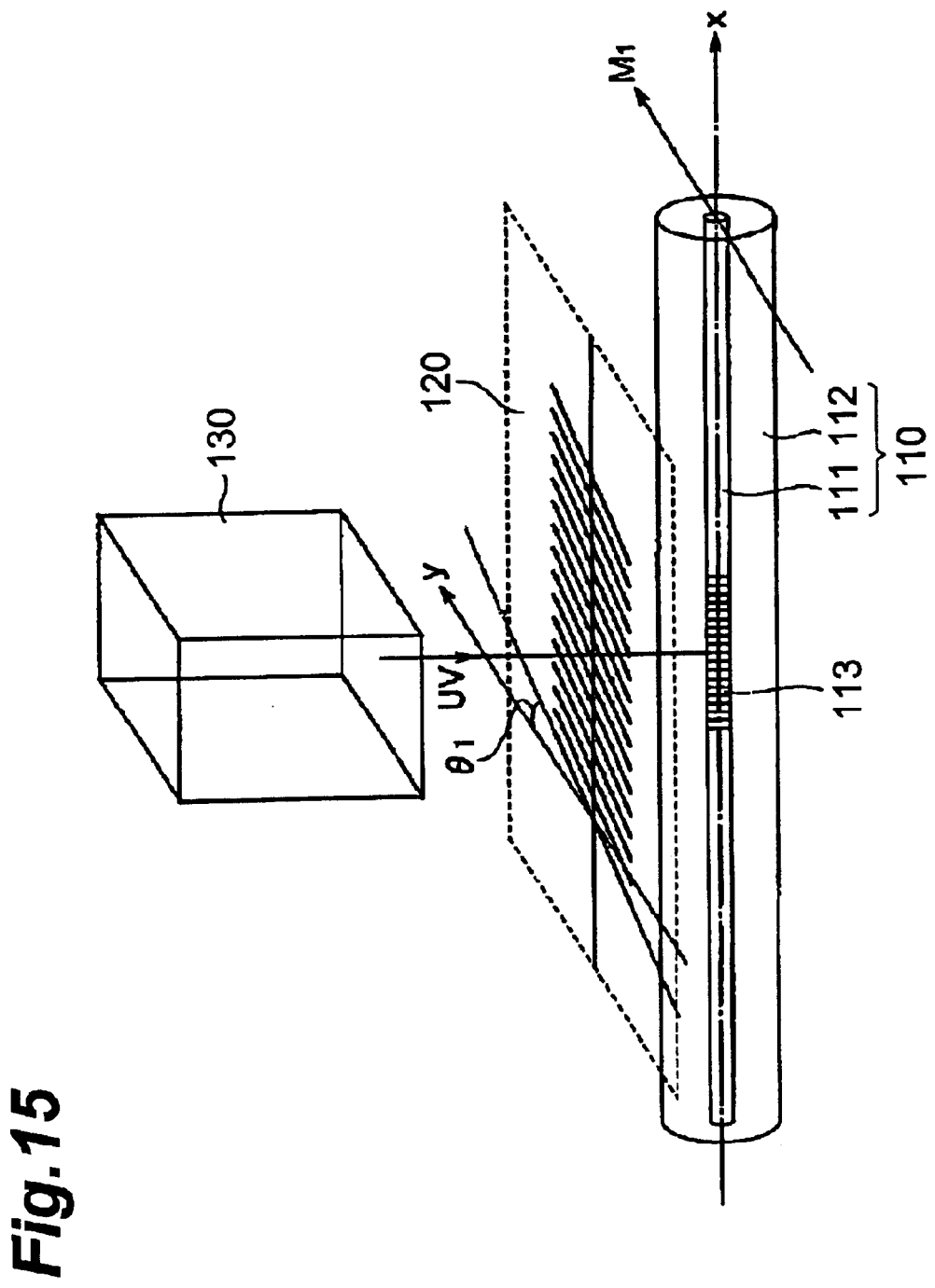
FIG. 15 is a a perspective view for explaining the method of making an optical waveguide type diffraction grating device in accordance with the fourth embodiment.

A method of making the optical waveguide type diffraction grating device 100 (tilt type diffraction grating device) 1 in accordance with the fourth embodiment will now be explained. FIGS. 15, 16A, 16b, 16c and 16D are drawings for explaining the method of making an optical waveguide type diffraction grating device in accordance with the fourth embodiment. FIG. 15 show perspective views, whereas FIGS. 16A, 16B, 16C and 16D show sectional views cut along a plane perpendicular to the optical axis.

First, an optical fiber 110, a phase grating mask 120, and a light source 130 are prepared. As mentioned above, the optical fiber 110 is based on silica glass, and includes a core region 11 doped with $GeO_2$ and a cladding region 112 surrounding the core region 111. The phase grating mask 120 is one in which one surface of a flat silica glass sheet is formed with a phase grating made of groove-like protrusions and recesses having a period of 2A. The light source 130 is one outputting light having a wavelength which induces a refractive index change in the core region 111 of the optical fiber 110 (hereinafter referred to as "refractive index change inducing light"). For example, a KrF excimer laser light source outputting a laser beam having a wavelength of 248 nm as refractive index change inducing light is used.

Then, as shown in FIG. 15, the phase grating mask 120 is arranged laterally with respect to the optical fiber 110 such that its surface formed with the phase grating opposes the optical fiber 110. At that time, the direction of grooves in the phase grating mask 120 inclines by an angle $\theta_1$ with respect to a plane perpendicular to the optical axis of the optical fiber 110. In the state where they are arranged as such, refractive index change inducing light UV outputted from the light source 130 perpendicularly irradiates the phase grating mask 120. Upon irradiation with the refractive index change inducing light UV, (+) first-order diffraction light and (−) first-order diffraction light occur due to a diffracting action of the phase grating mask 120, and interfere with each other, thereby generating interference fringes with a period A. In the core region 11 doped with $GeO_2$ in the optical fiber 110, the refractive index rises in response to the magnitude of energy of the refractive index change inducing light at each position of the interference fringes, thereby forming a refractive index modulated part $113_1$. In this refractive index modulated part $113_1$, letting $A_1$ be a line, perpendicular to a refractive index level plane $L_1$, intersecting the optical axis of the optical fiber 110, the angle formed between the line $A_1$ and the optical axis is $\theta_1$, whereas the deflection angle plane $M_1$ formed by the line $A_1$ and the optical axis is parallel to the plane of the phase grating mask 120 (see FIGS. 15 and 16A).

Irradiation with the refractive index change inducing light UV for a predetermined period of time in the state of arrangement shown in FIG. 16A as such forms the first refractive index modulated part $113_1$. After the formation, the irradiation with refractive index change inducing light UV is interrupted, while the optical fiber 110 is rotated by a predetermined angle about the optical axis during this interruption, so as to attain the state of arrangement shown in FIG. 16B. Then, irradiation with the refractive index change inducing light UV for a predetermined period of time in the state of arrangement shown in FIG. 16B forms the second refractive index modulated part $113_2$. In thus formed second refractive index modulated part $113_2$, letting $A_2$ be a line, perpendicular to a refractive index level plane $L_2$, intersecting the optical axis of the optical fiber 110, the angle formed between the line $A_2$ and the optical axis is $\theta_2$, whereas the deflection angle plane $M_2$ formed by the line $A_2$ and the optical axis is parallel to the plane of the phase grating mask 120. The deflection angle plane $M_2$ of the second refractive index modulated part $113_2$ does not coincide with the deflection angle plane $M_1$ of the already formed first refractive index modulated part $113_1$.

After the second refractive index modulated part $113_2$ is formed, the irradiation with refractive index change inducing light UV is interrupted, while the optical fiber 110 is rotated by a predetermined angle about the optical axis during this interruption, so as to attain the state of arrangement shown in FIG. 16C. Then, irradiation with the refractive index change inducing light UV for a predetermined period of time in the state of arrangement shown in FIG. 16C forms the third refractive index modulated part $113_3$. In thus formed third refractive index modulated part $113_3$, letting $A_3$ be a line, perpendicular to a refractive index level plane $L_3$, intersecting the optical axis of the optical fiber 110, the angle formed between the line $A_3$ and the optical axis is $\theta_3$, whereas the deflection angle plane $M_3$ formed by the line $A_3$ and the optical axis is parallel to the plane of the phase grating mask 120. The deflection angle plane $M_3$ of the third refractive index modulated part $113_3$ does not coincide with any of the deflection angle plane $M_1$ of the already formed first refractive index modulated part $113_1$, and the deflection angle plane $M_2$ of the already formed second refractive index modulated part $113_2$.

In a similar manner, the fourth to N-th refractive index modulated parts $113_4$ to $113_N$ are formed successively. When forming the N-th refractive index modulated part $113_N$, irradiation with the refractive index change inducing light UV for a predetermined period of time in the state of arrangement shown in FIG. 16D forms the N-th refractive index modulated part $113_N$. In thus formed N-th refractive index modulated part $113_N$, letting $A_N$ be a line, perpendicular to a refractive index level plane $L_N$, intersecting the optical axis of the optical fiber 110, the angle formed between the line $A_N$ and the optical axis is $\theta_N$, whereas the deflection angle plane $M_N$ formed by the line $A_N$ and the optical axis is parallel to the plane of the phase grating mask 120. The deflection angle plane $M_N$ of the N-th refractive index modulated part $113_N$ does not coincide with any of the deflection angle planes $M_1$ to $M_{N-1}$ of the already formed first to (N−1)-th refractive index modulated parts $113_1$, to $113_{N-1}$.

Though individual values of $\theta_n$ are the same when the position of the phase grating mask 120 is held at a fixed position, the values of $\theta_n$ can be made different from each other if the phase grating mask 120 is rotated on a plane thereof. Also, though all the refractive index modulation periods along respective lines $A_n$, in the refractive index modulated parts $113_n$ have the same value when a single phase grating mask 120 is used, the refractive index modulation periods along respective lines An in the refractive index modulated parts $113_n$ can be made different from each other if the phase grating mask is replaced with one having a different phase grating period.

Thus, in the method of making an optical waveguide type diffraction grating device in accordance with this embodiment, N refractive index modulated parts $113_1$ to $113_N$ are successively formed along a longitudinal direction of the optical fiber 10 such that the line $A_n$ perpendicular to the refractive index level plane $L_n$ is not parallel to the optical axis of the optical fiber 10 (i.e., $\theta_n \neq 0$). Also, the n-th refractive index modulated part $13_n$ is formed such that its deflection angle plane $M_n$ does not coincide with any of the respective deflection angle planes $M_1$ to $M_{-1}$ of the already formed first to (n−1)-th refractive index modulated parts $113_1$ to $113_{-1}$. Further, given two of the N refractive index modulated parts $113_1$ to $113_N$ are formed such that their respective forming areas overlap each other at least partially. Thus, the tilt type diffraction grating device 100 in accordance with this embodiment is made.

In particular, it is preferred that the optical fiber 10 be rotated about the optical axis by a predetermined angle of 180 degrees/N after the (n−1)-th refractive index modulated part $113_{n-1}$ is formed, and then the n-th refractive index modulated part $113_n$ be formed. In thus made tilt type diffraction grating device 100, the respective deflection angle planes $M_1$ to $M_N$ of the N refractive index modulated parts $113_1$ to $113_N$ shift from each other at intervals of 180 degrees/N about the optical axis of the optical fiber 110, where by the polarization-dependent loss is efficiently reduced.

Preferably, the individual refractive index modulated parts $113_n$ are formed such that lines $A_n$ perpendicular to respective refractive index level planes $L_n$ form the same angle $\theta_n$ with the optical axis of the optical fiber 110, respective forming areas have the same length $D_n$ along the longitudinal direction of the optical fiber 110, respective refractive index modulation periods are the same, and respective refractive index modulation amplitudes are the same. Thus made tilt type diffraction grating device 100 becomes one whose polarization-dependent loss is efficiently reduced.

Preferably, when forming each refractive index modulated part $113^n$, the transmission loss or polarization-dependent loss of the tilt type diffraction grating device 100 in the process of making is monitored. Thus made tilt type diffraction grating device 100 becomes one whose polarization-dependent loss is efficiently reduced.

An example of the optical waveguide type diffraction grating device (tilt type diffraction grating device) 1 in accordance with this embodiment and method of making the same will now be explained. In this example, the optical fiber 110 was one in which not only the core region 11 but also the cladding region 112 was doped with $GeO_2$. The period of the phase grating mask 120 was not fixed but gradually changed along a direction perpendicular to the direction of grooves, with a center period of 1.0650 μm and a period changing rate of 10.0 nm/cm. Employed as the light source 30 was a KrF excimer laser light source outputting a laser beam having a wavelength of 248 nm as refractive index change inducing light.

Thus made tilt type diffraction grating device 100 of this example had two refractive index modulated parts $113_1$, $113_2$. The two refractive index modulated parts $113_1$, $113_2$ each had a forming area with a length of 5 mm and totally overlapped each other. The deflection angle plane $M_1$ of the refractive index modulated part $113_1$ and the deflection angle plane $M_2$ of the refractive index modulated part $113_2$ were orthogonal to each other.

In the manufacturing method of this example, the first refractive index modulated part $113_1$ was initially formed, the optical fiber 110 was rotated by 90 degrees about the optical axis thereafter while the irradiation with refractive index change inducing light UV was interrupted, and then the second refractive index modulated part $113_2$ was formed. When forming each of the two refractive index modulated parts $113_1$, $113_2$, the transmission loss of the tilt type diffraction grating device 100 in the process of making was monitored.

Figure 17A:
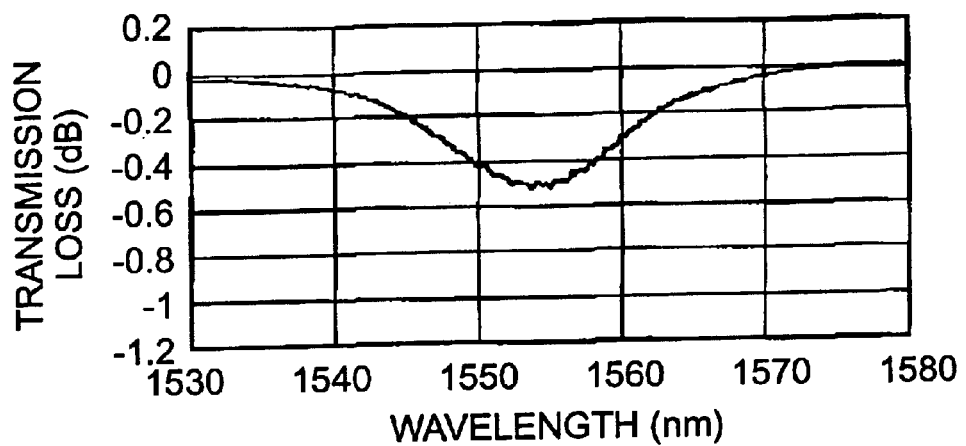
FIGS. 17A and 17B are graphs showing transmission characteristics of the optical waveguide type diffraction grating device (tilt type diffraction grating device) in accordance with an example. In the drawing.
Figure 17B:
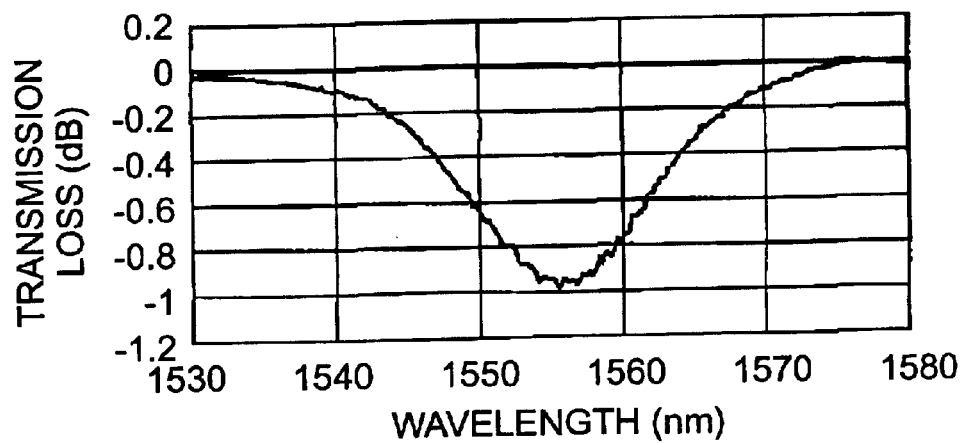

In this example, the target value of transmission loss at a wavelength yielding the maximum transmission loss was set to 1 dB. When forming the first refractive index modulated part $113_1$, the irradiation with refractive index change inducing light UV was interrupted at the time when the monitored transmission loss became ½ (0.5 dB) of the target value. Subsequently, when forming the second refractive index modulated part $113_2$, the irradiation with refractive index change inducing light UV was interrupted at the time when the monitored transmission loss became the target value (1 dB). FIG. 17A is a graph showing a transmission characteristic at the time when the first refractive index modulated part $113_2$ was completely formed, whereas FIG. 17B is a graph showing a transmission characteristic at the time when the second refractive index modulated part $13_2$ was completely formed. As shown in this graph, the maximum value of transmission loss in the tilt type diffraction grating device 1 in accordance with this example was 0.5 dB at the time when the first refractive index modulated part $113_1$ was completely formed, and 1.0 dB at the time when the second refractive index modulated part $113_2$ was completely formed.

Figure 18A:
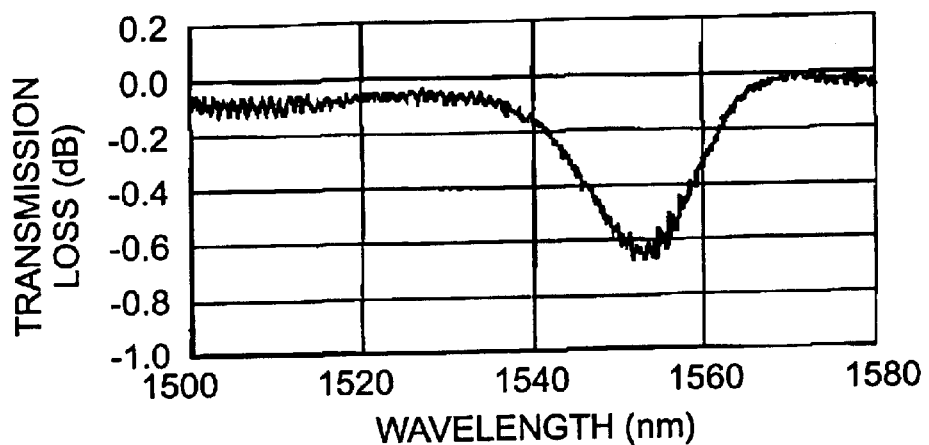
FIGS. 18A and 18B are graphs showing transmission and polarization-dependent loss characteristics of the optical wave guide type diffraction grating device (tilt type diffraction grating device) in accordance with the fourth embodiment.
Figure 18B:
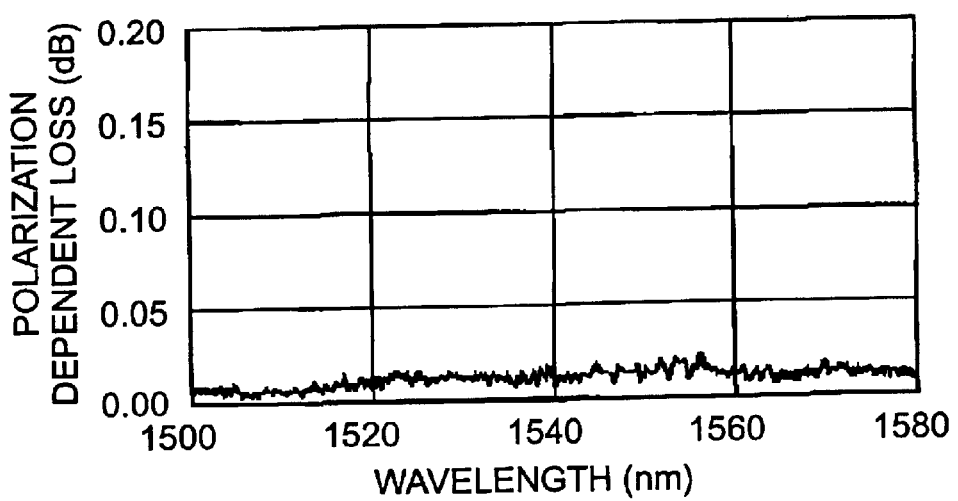
Figure 19A:
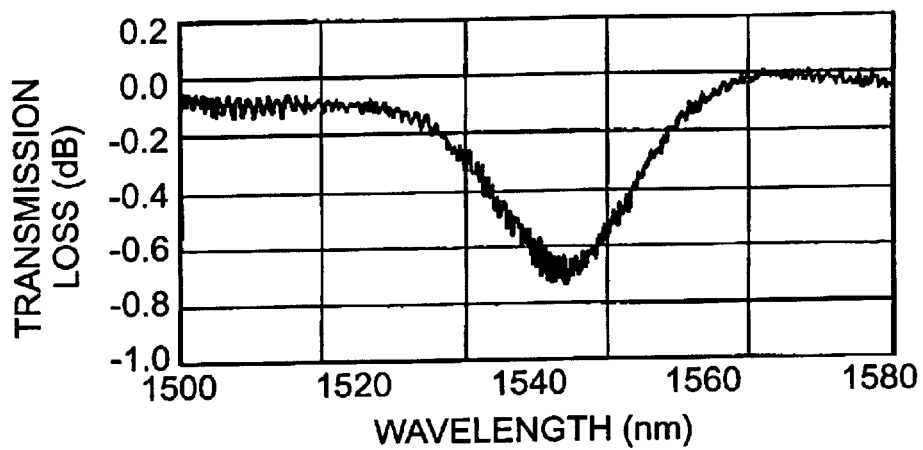
FIGS. 19A and 19B are graphs showing transmission and polarization-dependent loss characteristics of the optical waveguide type diffraction grating device (tilt type diffraction grating device) in accordance with the fourth embodiment.
Figure 19B:
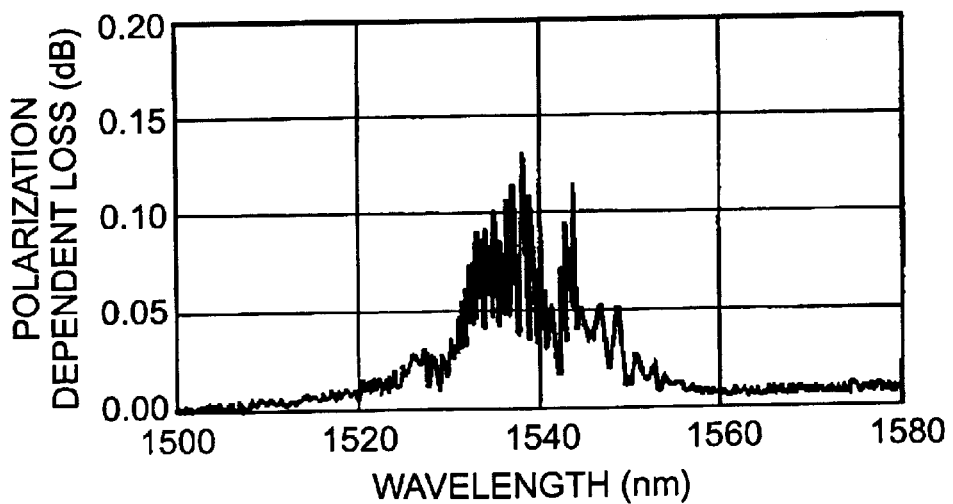

FIG. 18A is a graph showing a transmission characteristic of the tilt type diffraction grating device in accordance with this example, whereas FIG. 18B is a graph showing a polarization-dependent loss characteristic of the tilt type diffraction grating device in accordance with this example. FIG. 19A is a graph showing a transmission characteristic of the tilt type diffraction grating device in accordance with a comparative example, whereas FIG. 19B is a graph showing a polarization-dependent loss characteristic of the tilt type diffraction grating device in accordance with the comparative example. Here, the tilt type diffraction grating device in accordance with the comparative example has only one refractive index modulated part without overwriting.

As can be seen when FIGS. 18A and 19A are compared with each other, the respective transmission spectra of the tilt type diffraction grating devices in accordance with the example and comparative example had forms similar to each other, each yielding the maximum transmission loss value of about 0.6 dB. However, as can be seen when FIGS. 18B and 19B are compared with each other, the maximum polarization-dependent loss value of the tilt type diffraction grating device in accordance with the comparative example was about 0.125 dB, whereas the maximum polarization-dependent loss value of the tilt type diffraction grating device in accordance with the example was about 0.03 dB. The maximum polarization-dependent loss value of the tilt type diffraction grating device in accordance with the example was about ¼ of the maximum polarization-dependent loss value of the tilt type diffraction grating device in accordance with the comparative example, and about 1/20 of the maximum transmission loss value of the tilt type diffraction grating device in accordance with the example.

Figure 20:
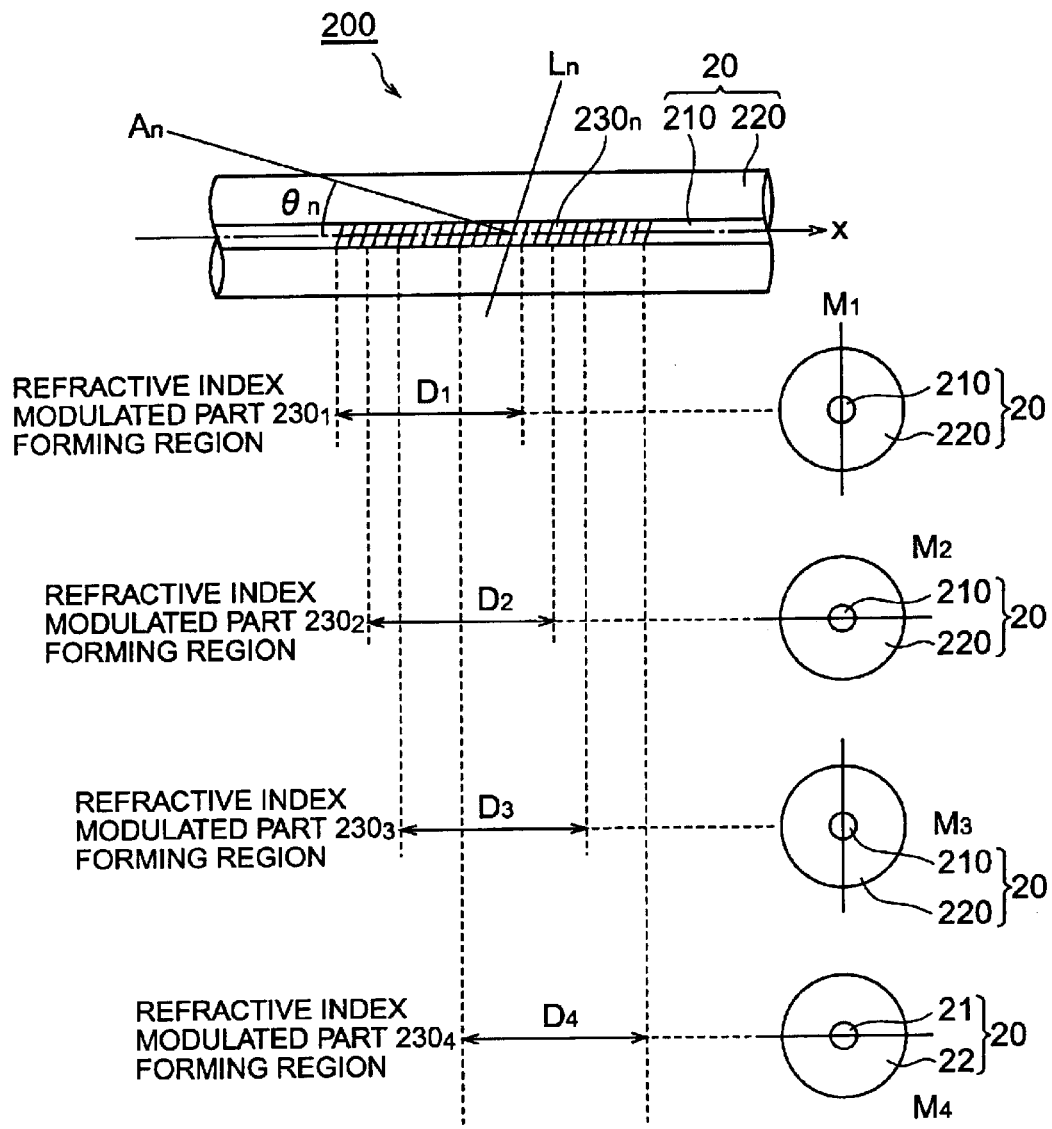
FIG. 20 is an explanatory view of a conventional tilt type diffraction grating device in accordance with the fifth embodiments.

FIG. 20 is an explanatory view of an optical waveguide type diffraction grating device (tilt type diffraction grating device) 200 according to the fifth embodiment. This drawing illustrates a sectional view cut along a plane including the optical axis, and a sectional view cut along a plane perpendicular to the optical axis. The tilt type diffraction grating device 200 according to this embodiment, which is illustrated in this drawing, has N (where N is an integer of 2 or above) refractive index modulated parts $230_1$-$230^N$ formed along the longitudinal direction of the optical fiber 20, which is the optical waveguide. The optical fiber 20 has silica glass as its base, and comprises a $GeO_2$-doped core region 210, and a cladding region 220 surrounding this core region 210.

For each refractive index modulated part $230_n$ (where n is an arbitrary integer not less than 1 and not greater than N), the refractive index level plane, wherein the refractive index becomes level, is expressed by $L_n$; the line perpendicular to the refractive index level plane $L_n$, intersecting the optical axis (x axis) of the optical fiber 20, is expressed by $A_n$; the angle formed between the line $A_n$ and the optical axis is expressed by $θ_n$; and the deflection angle plane formed by the line $A_n$ and the optical axis is expressed by $M_n$. The areas of formation, refractive index level plane $L_n$, line $A_n$, and angle $θ_n$ of the refractive index modulated parts $23_n$ are all as previously explained.

This tilt type diffraction grating device 200 is characterized in that the deflection angle planes $M_n$ of the refractive index modulated parts $23_n$ shift from each other at intervals of 360 degrees/N about the optical axis. Note that, in the drawing, N=4. In this case, the double refraction characteristic which is caused by nonaxisymmetry in each of the refractive index modulated parts $230_1$ and $230_3$, the deflection angle planes $M_n$ of which differ from each other by 180°, is offset, and since the double refraction characteristic which is caused by nonaxisymmetry in each of the refractive index modulated parts $230_3$ and $230_4$, the deflection angle planes $M_n$ of which differ from each other by 180°, is offset, the polarization-dependent loss in the optical waveguide type diffraction grating device 20 is reduced efficiently. Note that here, nonaxisymmetry indicates that the rise in the refractive index is increasing on the incident side of the refractive index change-inducing light in the refractive index modulated part $230_1$, which is formed by irradiating refractive index change-inducing light onto the optical fiber 200. Consequently, by forming the refractive index modulated parts 230₁ and 230₃ by irradiating refractive index change-inducing light onto the optical fiber 200 from opposite directions, the double refraction characteristic caused by the nonaxisymmetry [in these refractive index modulated parts] is offset.

In this tilt type diffraction grating device 2 also, it is suitable for the polarization-dependent loss to be ⅒ or less of the largest transmission loss value in the wavelength at which transmission loss is greatest. This kind of tilt type diffraction grating device 20 may also be used appropriately as an optical device (or one part thereof) in which low polarization-dependent loss is required, in the field of optical transmission, and for example, may be used appropriately as a gain equalizer for equalizing the gain in an optical fiber amplifier.

Figure 21A:
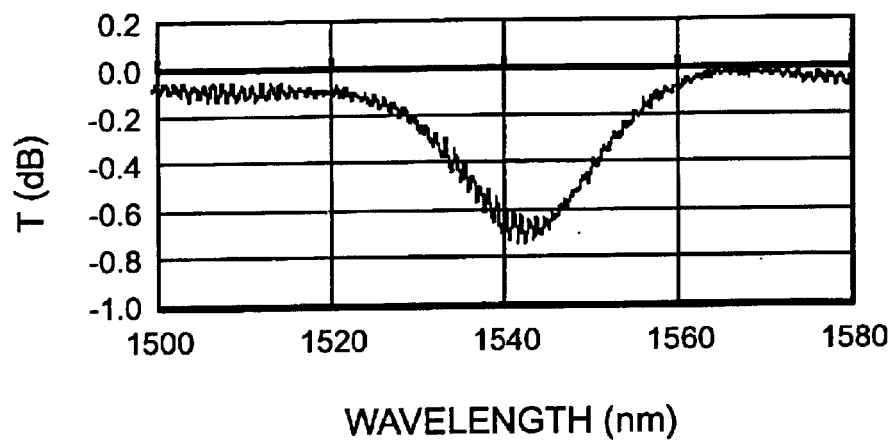
FIGS. 21A and 21B are graphs showing characteristics of a tilt type diffraction grating device in which refractive index change inducing light is irradiated from only one direction to form one refractive index modulated part.
Figure 21B:
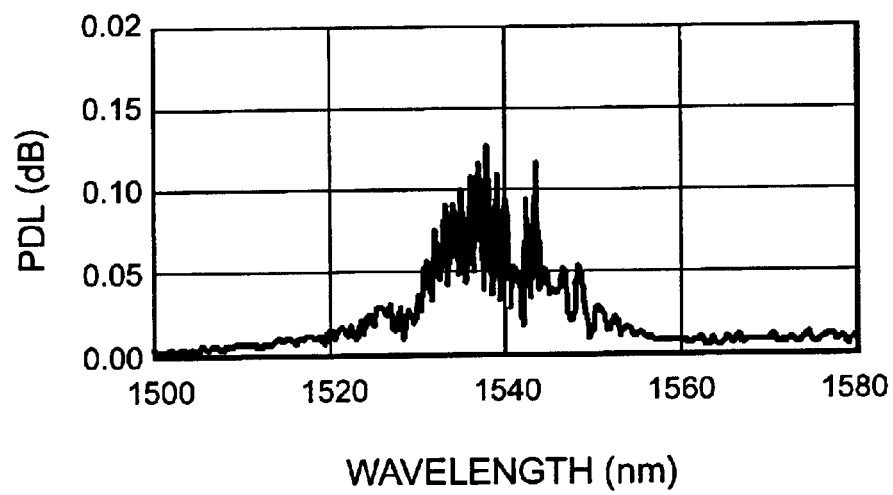
Figure 22A:
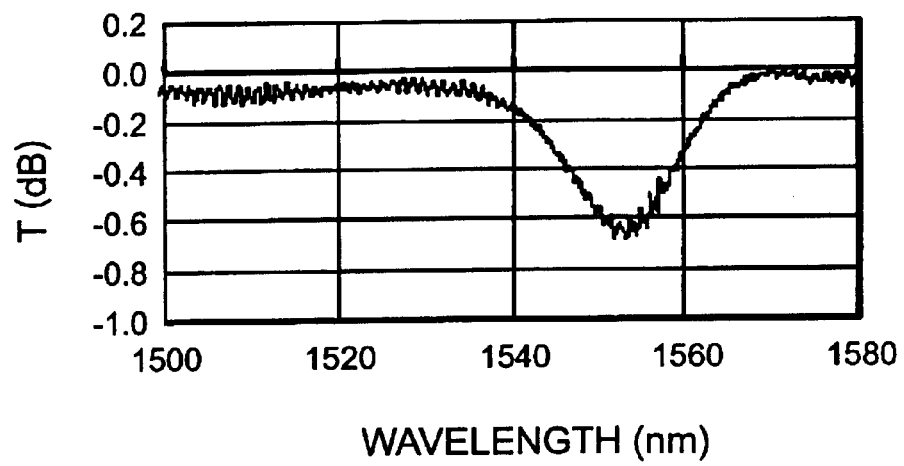
FIGS. 22A and 22B are graphs showing characteristics of a tilt type diffraction grating device in which refractive index change inducing light is irradiated from two directions which differ from each other by 90° to form two refractive index modulated parts.
Figure 22B:
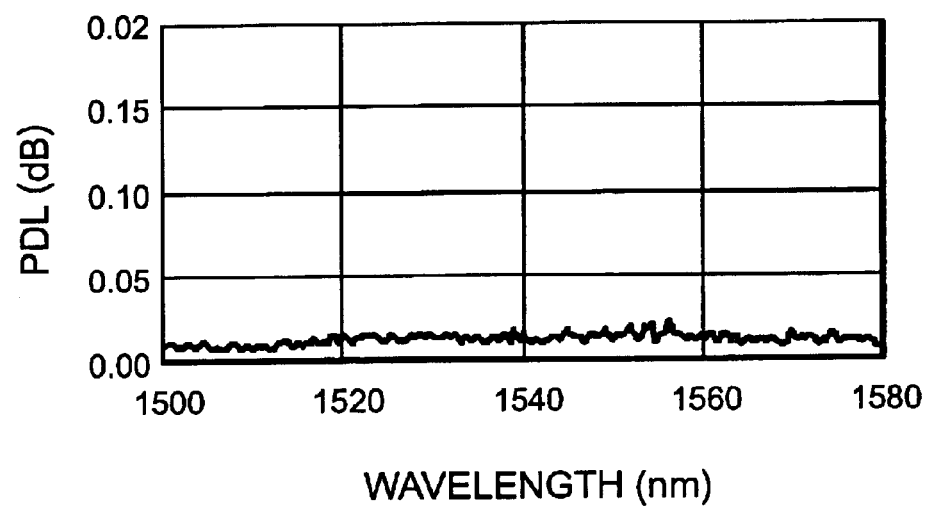
Figure 23A:
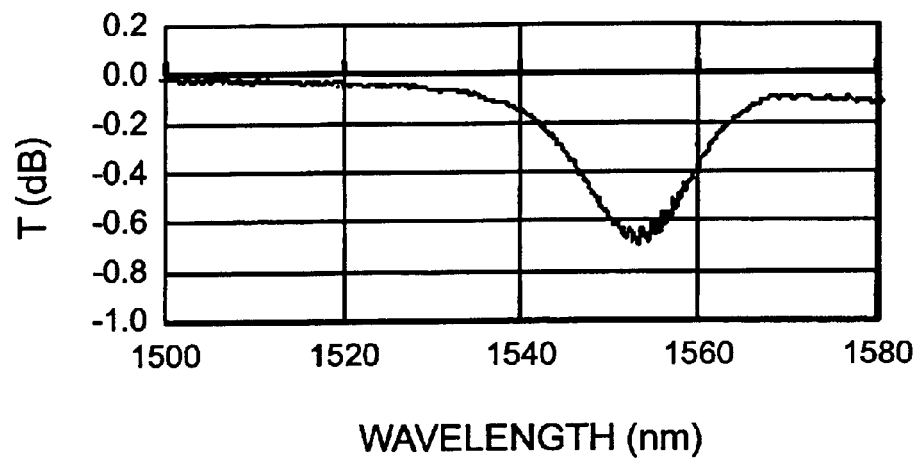
FIGS. 23A and 23B are graphs showing characteristics of a tilt type diffraction grating device in which refractive index change inducing light is irradiated from four directions, differing from each other by 90° to form four refractive index modulated parts.
Figure 23B:
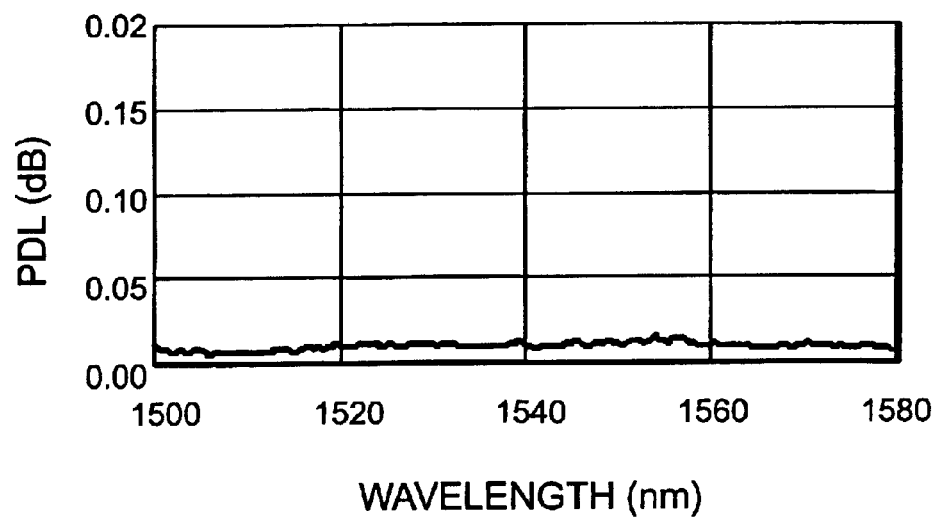

FIGS. 21A, 21B, 22A, 22B, 23A, and 23B are each graphs showing the wavelength dependence of the transmittance T and polarization-dependence loss PDL respectively in three types of tilt type diffraction grating devices. FIGS. 21A and 21B are graphs showing characteristics of a tilt type diffraction grating device in which refractive index change inducing light is irradiated from only one direction to form one refractive index modulated part. FIGS. 22A and 22B are graphs showing characteristics of a tilt type diffraction grating device 10 in which refractive index change inducing light is irradiated from two directions which differ from each other by 90° to form two refractive index modulated parts. FIGS. 23A and 23B are graphs showing characteristics of a tilt type diffraction grating device 2 in which refractive index change inducing light is irradiated from four directions, differing from each other by 90° at a time, to form four refractive index modulated parts. In each of the tilt type diffraction grating device 100 and the tilt type diffraction grating device 200, there fractive index modulated parts are formed so as to overlap each other.

As can be understood by comparing FIGS. 21A, 22A and 23A, the wavelength dependence of the transmittance T in each of the three types of tilt type diffraction grating device is substantially the same. On the other hand, as can be understood by comparing FIGS. 21B, 22B and 23B, the polarization-dependence loss PDL of the tilt type diffraction grating device formed with one refractive index modulated part reaches 0.127 dB, whereas the polarization-dependence loss PDL of the tilt type diffraction grating device 1 is as small as 0.023 dB, and the polarization-dependence loss PDL of the tilt type diffraction grating device 2 is, at 0.016 dB, even smaller.

According to the present invention, as explained in detail in the foregoing, N (N being an integer not smaller than 2) refractive index modulated parts are formed, respective lines perpendicular to refractive index level planes of the refractive index modulated parts are not parallel to the optical axis of the optical waveguide, respective deflection angle planes of refractive index modulated parts do not coincide with each other, and given two refractive index modulated parts have respective forming areas overlapping each other at least partially. Thus configured optical waveguide type diffraction grating device becomes a short one whose polarization-dependent loss is reduced.

What is claimed is:

1. An optical waveguide type filter provided with a periodically perturbation part in a part of an optical waveguide in a longitudinal direction thereof; wherein a line perpendicular to a level plane of said periodically perturbation part is tilted with respect to an optical axis of said optical waveguide; and wherein, when said optical waveguide is made linear without twisting, said optical waveguide includes a portion where a plane formed by a line passing a given point on said optical axis in said periodically perturbation part and being perpendicular to a level plane passing said given point and said optical axis varies depending on a position of said given point in the longitudinal direction thereof, wherein said plane has a part rotated about the optical axis with respect to the longitudinal direction of the optical waveguide.

2. An optical waveguide type filter according to claim 1, wherein said periodically perturbation part is divided into a plurality of groups in the longitudinal direction of the optical waveguide, said plane is fixed within each group but not varies between one group and another group.

3. An optical waveguide type filter provided with a periodically perturbation part in a part of an optical waveguide in a longitudinal direction thereof wherein a line perpendicular to a level plane of said periodically perturbation part is tilted with respect to an optical axis of said optical waveguide; and wherein, when said optical waveguide is made linear without twisting, said optical waveguide includes a portion where a plane formed by a line passing a given point on said optical axis in said periodically perturbation part and being perpendicular to a level plane passing said given point and said optical axis varies depending on a position of said given point in the longitudinal direction thereof, wherein said periodically perturbation part is divided into N groups in the longitudinal direction of the optical waveguide, said planes in respective groups shift from each other at intervals of 90 degrees/(N−1 about the optical axis and said plane is fixed within each group but does not vary between one group and another group.

4. A method of making an optical waveguide type filter provided with a periodically perturbation part in a part of an optical waveguide in a longitudinal direction thereof, said method comprising the steps of forming an optical waveguide with a periodically perturbation part such that a line perpendicular to a level plane of said periodically perturbation part is tilted with respect to an optical axis of said optical waveguide while a plane formed by a line passing a given point on said optical axis and being perpendicular to said level plane and said optical axis is fixed; then twisting the part formed with the periodically perturbation part about said optical axis in the longitudinal direction thereof; and securing the twisted part so as not to be untwisted.

5. A method of making an optical waveguide type filter according to claim 4, wherein, when twisting said optical waveguide about the optical axis in the longitudinal direction thereof, said twisting is carried out while monitoring a polarization-dependent loss of said optical waveguide, and said optical waveguide is secured so as not to be untwisted at the time when the polarization-dependent loss is minimized.

6. A method of making an optical waveguide type filter provided with a periodically perturbation part in a part of an optical waveguide in a longitudinal direction thereof, said method comprising the steps of twisting a part of the optical waveguide about an optical axis in a longitudinal direction thereof so as to form a part of said optical waveguide with a periodically perturbation part such that a line perpendicular to a level plane of said periodically perturbation part is tilted with respect to an optical axis of said optical waveguide while a plane formed by a line passing a given point on said optical axis and being perpendicular to said level plane and said optical axis is fixed; and then untwisting said optical waveguide.

7. An optical fiber amplifier comprising, at least, an erbium-doped optical fiber and a pumping laser light source; wherein an optical waveguide type filter is inserted as a gain equalizer in an amplifier circuit, said optical waveguide type filter being provided with a periodically perturbation part in a part of an optical waveguide in a longitudinal direction thereof;

wherein a line perpendicular to a level plane of said periodically perturbation part is tilted with respect to an optical axis of said optical waveguide; and wherein, when made linear without twisting, said optical waveguide includes a portion where a plane formed by a line passing a given point on said optical axis in said periodically perturbation part and being perpendicular to a level plane passing said given point and said optical axis varies depending on a position of said given point in the longitudinal direction thereof.

8. An optical waveguide type diffraction grating device comprising N (N being an integer not smaller than 2) refractive index modulated parts formed along a longitudinal direction of an optical waveguide;

wherein respective lines perpendicular to refractive index level planes of said N refractive index modulated parts are not parallel to an optical axis of said optical waveguide;

wherein respective deflection angle planes formed between lines perpendicular to refractive index level planes of said N refractive index modulated parts and said optical axis of said optical waveguide do not coincide with each other, wherein each deflection angle plane has a part rotated about the optical axis with respect to the longitudinal direction of the optical waveguide; and where two of said N refractive index modulated pails have respective forming areas overlapping each other at least partially.

9. An optical waveguide type diffraction grating device comprising N (N being an integer not smaller than 2) refractive index modulated parts formed along a longitudinal direction of an optical waveguide;

wherein respective lines perpendicular to refractive index level planes of said N refractive index modulated parts are not parallel to an optical axis of said optical waveguide;

wherein respective deflection angle planes formed between lines perpendicular to refractive index level planes of said N refractive index modulated carts and said optical axis of said optical waveguide do not coincide with each other;

where two of said N refractive index modulated parts have respective forming areas overlapping each other at least partially, and wherein respective deflection angle planes of said N refractive index modulated parts shift from each other at intervals of 180 degrees/N about said optical axis of said optical waveguide.

10. An optical waveguide type diffraction grating according to claim 9, wherein, in said N refractive index modulated parts, respective lines perpendicular to refractive index level planes form the same angle with said optical axis of said optical waveguide, respective forming areas have the same length along said longitudinal direction of said optical waveguide, respective refractive index modulation periods are the same, and respective refractive index modulation amplitudes are the same.

11. An optical waveguide type diffraction grating device comprising N (N being an integer not smaller than 2) refractive index modulated parts formed along a longitudinal direction of an optical waveguide;

wherein respective lines perpendicular to refractive index level planes of said N refractive index modulated parts are not parallel to an optical axis of said optical waveguide;

wherein respective deflection angle planes formed between lines perpendicular to refractive index level planes of said N refractive index modulated parts and said optical axis of said optical waveguide do not coincide with each other;

where two of said N refractive index modulated parts have respective forming areas overlapping each other at least partially; and wherein a polarization-dependent loss at a wavelength yielding the maximum transmission loss is not greater than $1/10$ of the maximum transmission loss value.

12. A method of making an optical waveguide type diffraction grating device, said method comprising the step of forming an optical waveguide type diffraction grating device;

wherein, while successively forming N (N being an integer not smaller than 2) refractive index modulated parts along a longitudinal direction of an optical waveguide such that respective lines perpendicular to refractive index level planes are not parallel to an optical axis of said optical waveguide, the n-th (n being an integer of at least 2 but not greater than N) refractive index modulated part is formed such that a deflection angle plane formed between a line perpendicular to a refractive index level plane and said optical axis of said optical waveguide does not coincide with any of respective deflection angle planes of the refractive index modulated parts of already formed first to (n−1)-th refractive index modulated parts, wherein said deflection angle plane has a part rotated about the optical axis with respect to the longitudinal direction of the optical waveguide; and two of said N refractive index modulated parts have respective forming areas overlapping each other at least partially.

13. A method of making an optical waveguide type diffraction grating device, said method comprising the step of forming an optical waveguide diffraction grating device:

wherein, while successively forming N (N being an integer not smaller than 2) refractive index modulated parts along a longitudinal direction of an optical waveguide such that respective lines perpendicular to refractive index level planes are not parallel to an optical axis of said optical waveguide, the n-th (n being an integer of at least 2 but not greater than N) refractive index modulated part is formed such that a deflection angle plane formed between a line perpendicular to a refractive index level plane and said optical axis of said optical waveguide does not coincide with any of respective deflecting angle planes of the refractive index modulated parts of already formed first to (n−1-th reflective index modulated parts;

two of said N refractive index modulated parts have respective forming areas overlapping each other at least partially; and wherein respective deflection angle planes of said N refractive index modulated parts are shifted from each other at intervals of 180 degrees/N about said optical axis of said optical waveguide.

14. A method of making an optical waveguide type diffraction grating device, said method comprising the step of forming an optical waveguide type diffraction grating device;

wherein, while successively forming N (N being an integer not smaller than 2) refractive index modulated parts along a longitudinal direction of an optical waveguide such that respective lines perpendicular to refractive index level planes are not parallel to an optical axis of said optical waveguide, the n-th (n being an integer of at least 2 but not greater than N) refractive index modulated part is formed such that a deflection angle plane formed between a line perpendicular to a refractive index level plane and said optical axis of said optical waveguide does not coincide with any of respective deflection angle planes of the refractive index modulated parts of already formed first to (n−1-th refractive index modulated parts;

two of said N refractive index modulated parts have respective forming areas overlapping each other at least partially; and wherein said N refractive index modulated parts are formed such that respective lines perpendicular to refractive index level planes form the same angle with said optical axis of said optical waveguide, respective forming areas have the same length along said longitudinal direction of said optical waveguide, respective refractive index modulation periods are the same, and respective refractive index modulation amplitudes are the same.

15. A method of making an optical waveguide type diffraction grating device according to claim 12, wherein each of said N refractive index modulated parts is formed while monitoring a transmission loss.

16. A method of making an optical waveguide type diffraction grating device according to claim 12, wherein each of said N refractive index modulated parts is formed while monitoring a polarization-dependent loss.

17. An optical waveguide type diffraction grating device comprising N (N being an integer not smaller than 2) refractive index modulated parts formed along a longitudinal direction of an optical waveguide;

wherein respective lines perpendicular to refractive index level planes of said N refractive index modulated parts are not parallel to an optical axis of said optical waveguide;

wherein respective deflection angle planes formed between lines perpendicular to refractive index level planes of said N refractive index modulated parts and said optical axis of said optical waveguide do not coincide with each other;

where two of said N refractive index modulated nap have respective forming areas overlapping each other at least partially; and wherein the deflection angle planes of each of said N refractive index modulated parts shift from each other at intervals of 360 degrees/N about the optical axis of said optical waveguide.

18. An optical waveguide type filter provided with a periodically perturbation part in a part of an optical waveguide in a longitudinal direction thereof; wherein a line perpendicular to a level plane of said periodically perturbation part is tilted with respect to an optical axis of said optical waveguide; and wherein, when said optical waveguide is made linear without twisting, said optical waveguide includes a portion where a plane formed by a line passing a given point on said optical axis in said periodically perturbation part and being perpendicular to a level plane passing said given point and said optical axis varies depending on a position of said given point in the longitudinal direction thereof, wherein said periodically perturbation part is separated into N groups in the longitudinal direction of the optical waveguide, and said plane of each group shifts at intervals of 90 degrees/N about the optical axis.

* * * * *